United States Patent
Ren et al.

(10) Patent No.: US 10,938,531 B2
(45) Date of Patent: Mar. 2, 2021

(54) DATA TRANSMISSION METHOD, NETWORK DEVICE, AND TERMINAL DEVICE

(71) Applicant: Huawei Technologies Co., Ltd., Shenzhen (CN)

(72) Inventors: Xiang Ren, Shanghai (CN); Yong Liu, Shanghai (CN); Xiaoyan Bi, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/432,525

(22) Filed: Jun. 5, 2019

(65) Prior Publication Data
US 2019/0288816 A1    Sep. 19, 2019

Related U.S. Application Data

(63) Continuation of application No. PCT/CN2018/093957, filed on Jul. 2, 2018.

(30) Foreign Application Priority Data

Jul. 17, 2017 (CN) .......................... 201710582621.9
Nov. 26, 2017 (CN) .......................... 201711199168.X

(51) Int. Cl.
*H04L 5/00* (2006.01)
*H04W 72/04* (2009.01)

(52) U.S. Cl.
CPC .............. *H04L 5/0048* (2013.01); *H04L 5/00* (2013.01); *H04W 72/042* (2013.01)

(58) Field of Classification Search
CPC ...... H04W 72/042; H04L 5/0094; H04L 5/00; H04L 5/0082; H04L 27/2611;
(Continued)

(56) References Cited

U.S. PATENT DOCUMENTS

2011/0128909 A1    6/2011    Luo et al.
2016/0087774 A1    3/2016    Guo et al.
(Continued)

FOREIGN PATENT DOCUMENTS

CN    102149082 A    8/2011
CN    102413572 A    4/2012
(Continued)

OTHER PUBLICATIONS

"Simultaneous transmission in sTTI," 3GPP TSG RAN WG1 Meeting #89, Hangzhou, P.R. China, R1-1707274, pp. 1-8, 3rd Generation Partnership Project—Valbonne, France (May 15-19, 2017).
(Continued)

*Primary Examiner* — Brian D Nguyen
(74) *Attorney, Agent, or Firm* — Leydig, Voit & Mayer, Ltd.

(57) ABSTRACT

A data transmission method includes: selecting, by a network device, at least one target time domain resource from a plurality of candidate time domain resources, where the at least one target time domain resource is used to carry a demodulation reference signal (DMRS); and sending, by the network device, first indication information to a terminal device, where the first indication information is used to indicate the at least one target time domain resource.

12 Claims, 32 Drawing Sheets

(58) Field of Classification Search
CPC ... H04L 5/0048; H04L 5/0064; H04L 5/0023; H04B 7/0413
See application file for complete search history.

(56) References Cited

U.S. PATENT DOCUMENTS

| | | | | |
|---|---|---|---|---|
| 2016/0330011 | A1* | 11/2016 | Lee | H04L 5/1461 |
| 2017/0171842 | A1 | 6/2017 | You et al. | |
| 2018/0212733 | A1* | 7/2018 | Khoryaev | H04L 5/0051 |
| 2018/0241508 | A1* | 8/2018 | Chervyakov | H04L 25/0224 |
| 2018/0279388 | A1* | 9/2018 | Miao | H04W 72/04 |
| 2018/0316469 | A1* | 11/2018 | Jiang | H04L 5/0048 |
| 2019/0089493 | A1* | 3/2019 | Andreoli-Fang | H04W 72/14 |
| 2019/0123864 | A1* | 4/2019 | Zhang | H04B 7/0695 |
| 2019/0306808 | A1* | 10/2019 | Gao | H04W 88/08 |

FOREIGN PATENT DOCUMENTS

| | | |
|---|---|---|
| CN | 103874207 A | 6/2014 |
| CN | 103944665 A | 7/2014 |
| CN | 104125186 A | 10/2014 |
| CN | 106856426 A | 6/2017 |
| EP | 2494754 A2 | 9/2012 |
| EP | 3389204 A1 | 10/2018 |

OTHER PUBLICATIONS

"Multiplexing different types of DL RS," 3GPP TSG RAN WG1 NR Ad Hoc Meeting, Qingdao, China, R1-1710009, XP051299234, pp. 1-8, 3rd Generation Partnership Project, Valbonne, France (Jun. 27-30, 2017).

"Discussion on DL DMRS for sTTI," 3GPP TSG RAN WG1 Meeting #89, Hangzhou, China, R1-1707552, XP051272760, pp. 1-7, 3rd Generation Partnership Project, Valbonne, France (May 15-20, 2017).

"On DL DMRS Design," 3GPP TSG RAN WG1 Meeting NR Ad-hoc, Qingdao, P.R. China, R1-1710294, XP051299510, pp. 1-10, 3rd Generation Partnership Project, Valbonne, France (Jun. 27-30, 2017).

"Discussion on downlink DMRS design," 3GPP TSG RAN WG1 Meeting #89, Hangzhou, P.R. China, R1-1707130, XP051272356, pp. 1-11, 3rd Generation Partnership Project, Valbonne, France (May 15-19, 2017).

"Further Evaluation and Discussion on Dmrs Design Details," 3GPP TSG-RAN WG1 NR#2, Qingdao, China, R1-1709909, XP051299134, pp. 1-9, 3rd Generation Partnership Project, Valbonne, France (Jun. 27-30, 2017).

"Discussion on DL DMRS design," 3GPP TSG RAN WG1 Meeting #89, Hangzhou, China, R1-1708596, XP051273787, pp. 1-14, 3rd Generation Partnership Project, Valbonne, France (May 15-19, 2017).

"Considerations on UL DMRS indication," 3GPP TSG RAN WG1 Meeting #89, Hangzhou, China, R1-1707272, XP051272485, pp. 1-5, 3rd Generation Partnership Project, Valbonne, France (May 15-19, 2017).

"On UL DMRS indication for 2/3-symbol sPUSCH," 3GPP TSG RAN WG1 Meeting #89, Hangzhou, China, R1-1706985, XP051272215, pp. 1-6, 3rd Generation Partnership Project, Valbonne, France (May 15-19, 2017).

"Issues regarding DMRS structure and mapping," 3GPP TSG RAN WG1 Meeting #89, Qingdao, China, R1-1710105, XP051299329, pp. 1-15, 3rd Generation Partnership Project, Valbonne, France (Jun. 27-30, 2017).

"Considerations for LTE Downlink DMRS Overhead Reduction," 3GPP TSG RAN WG1 #89, Hangzhou, China, R1-1707187, XP051272402, pp. 1-5, 3rd Generation Partnership Project, Valbonne, France (May 15-19, 2017).

Vivo, "On DL DMRS design for NR," 3GPP TSG RAN WG1 Meeting #89, Hangzhou, P.R. China, R1-1707247, total 5 pages, 3rd Generation Partnership Project, Valbonne, France (May 15-19, 2017).

"Further Evaluation on DMRS Design Details," 3GPP TSG-RAN WG1 #89, R1-1707087, total 7 pages, 3rd Generation Partnership Project, Valbonne, France (May 15-19, 2017).

"On DM-RS design for NR," 3GPP TSG RAN WG1 Meeting #89, InterDigital, Inc., Hangzhou, P.R. China, R1-1708341, total 3 pages, 3rd Generation Partnership Project, Valbonne, France (May 15-19, 2017).

"WF on DL DMRS for self-contained feedback," 3GPP TSG RAN WG1 Meeting #89, ZTE, Hangzhou, China, R1-1709420, total 2 pages, 3rd Generation Partnership Project, Valbonne, France (May 15-19, 2017).

"DMRS configurations for CP-OFDM," 3GPP TSG RAN WG1 NR Ad-Hoc#2, Spreadtrum Communications, Qingdao, P.R. China, R1-1710362, total 6 pages, 3rd Generation Partnership Project, Valbonne, France (Jun. 27-30, 2017).

"On design of DL DM-RS for NR physical data channels," 3GPP TSG RAN WG1 NR Ad-Hoc#2, Nokia, Alcatel-Lucent Shanghai Bell, Qingdao, P.R. China, R1-1711305, total 8 pages, 3rd Generation Partnership Project, Valbonne, France (Jun. 27-30, 2017).

"3rd Generation Partnership Project; Technical Specification Group Radio Access Network; NR; Physical channels and modulation (Release 15)," 3GPP TS 38.211 V0.0.1, total 21 pages, 3rd Generation Partnership Project, Valbonne, France (Jun. 2017).

* cited by examiner

DATA TRANSMISSION METHOD, NETWORK DEVICE, AND TERMINAL DEVICE

CROSS-REFERENCE TO RELATED APPLICATIONS

This application is a continuation of International Application No. PCT/CN2018/093957, filed on Jul. 2, 2018, which claims priority to Chinese Patent Application No. 201711199168.X, filed on Nov. 26, 2017, and Chinese Patent Application No. 201710582621.9, filed on Jul. 17, 2017. The disclosures of the aforementioned applications are hereby incorporated by reference in their entireties.

TECHNICAL FIELD

Embodiments of this application relate to the communications field, and in particular, to a data transmission method, a network device, and a terminal device in the communications field.

BACKGROUND

In an existing Long Term Evolution (LTE) standard, single user (SU) multiple-input multiple-output (MIMO) supports multiplexing of a maximum of eight orthogonal demodulation reference signal (DMRS) ports, and a demodulation reference signal (DMRS) occupies 24 resource elements (REs). Specifically, in frequency domain, a DMRS port may be mapped to subcarriers 0, 1, 5, 6, 10, and 11 of each resource block (RB) pair; in time domain, a DMRS port may be mapped to symbols 5, 6, 12, and 13 of each subframe.

In the existing standard, a DMRS is usually mapped in a fixed pilot pattern to a physical resource block (PRB) based on a total quantity of antenna ports, and each DMRS port has a same function. With requirements imposed on a plurality of scenarios, a plurality of bands, and a plurality of transmission modes of 5G New Radio (NR), a future system needs to be applied to various complex communication scenarios, to meet various complex service requirements. Therefore, an existing DMRS mapping and configuration solution that is fixed in mapping manner and single in function cannot meet future various complex requirements.

SUMMARY

Embodiments of this application provide a data transmission method, a network device, and a terminal device, to flexibly configure a time domain resource that is used to transmit a DMRS between a network device and a terminal device, thereby meeting different service requirements of the terminal device.

According to a first aspect, a data transmission method is provided. The data transmission method includes: selecting, by a network device, at least one target time domain resource from a plurality of candidate time domain resources, where the at least one target time domain resource is used to carry a DMRS; and sending, by the network device, first indication information to a terminal device, where the first indication information is used to indicate the at least one target time domain resource.

Specifically, the network device may select the at least one target time domain resource from the plurality of candidate time domain resources, and send the first indication information to the terminal device to indicate the at least one target time domain resource. The terminal device determines, based on a configuration of the network device, the target time domain resource used to carry the DMRS, and transmits the DMRS to the network device by using the target time domain resource. The DMRS is carried in at least one resource unit.

After both the network device and the terminal device determine the target time domain resource used to carry the DMRS, the network device may send the DMRS by using the target time domain resource, and correspondingly, the terminal device receives the DMRS by using the target time domain resource; or the terminal device sends the DMRS by using the target time domain resource, and correspondingly, the network device receives the DMRS by using the target time domain resource. The foregoing description is not intended to be limiting with respect to the scope of this application.

According to the data transmission method in this embodiment of this application, a time domain resource that is used to transmit a DMRS between a network device and a terminal device can be flexibly configured, thereby meeting different service requirements of the terminal device.

Optionally, the network device may select the at least one target time domain resource from the plurality of candidate time domain resources based on a service requirement or an application scenario of the terminal device.

It should be understood that, the foregoing service requirement may be a requirement for fast data demodulation, or may be a requirement for high data transmission performance, or may be another particular requirement. The foregoing description is not intended to be limiting with respect to the scope of this application. The foregoing application scenario may be a current moving scenario of the terminal device that is determined based on a channel changing status of the terminal device, such as a high-speed moving scenario, a medium-speed moving scenario, or a low-speed moving scenario, or may be different frame structures such as current frame feedback or non-current frame feedback. The foregoing description is not intended to be limiting with respect to the scope of this application. For ease of description, a concept of a DMRS basic pattern is introduced to this specification. The DMRS basic pattern may be understood as a DMRS pattern that is on a specified quantity of consecutive symbols in time domain within a resource unit and that can support a maximum quantity of ports. It should be noted that the scope of this application is not intended to be limited to a specific symbol position of the DMRS basic pattern. For example, the DMRS basic pattern may be front-loaded, or may be backward-loaded. The scope of this application is not intended to be limited to a specific quantity of symbols of the DMRS basic pattern either. For example, the DMRS basic pattern may occupy one symbol, or may occupy two symbols. Further, the scope of this application is not intended to be limited to a port multiplexing mode of the DMRS basic pattern either, as shown in an example in FIG. 3.

It should be understood that, concepts such as a DMRS and a quantity of DMRSs in this specification are all specific to a DMRS basic pattern. To be specific, one DMRS is one DMRS basic pattern, and a quantity of DMRSs is a quantity of DMRS basic patterns.

Particularly, when a DMRS occupies two symbols, a forward-loading or backward-loading manner may be used, to place a DMRS in a corresponding time domain position. Forward-loading or backward-loading herein means that sorting is performed based on absolute port numbers of DMRS ports. Specifically, backward-loading means that DMRS ports are mapped, in ascending order of absolute port numbers, from a symbol located in front and occupied by a basic pattern in time domain to a symbol located behind and occupied by the basic pattern in time domain. Similarly, forward-loading means that DMRS ports are mapped, in ascending order of absolute port numbers, from a symbol located behind in time domain to a symbol located in front and occupied by a basic pattern in time domain. The foregoing description is not intended to be limiting with respect to the scope of this application. A mapping manner of a DMRS may be understood as a mapping order of a DMRS port.

In addition, for ease of understanding, a concept of a DMRS pattern is introduced to this specification. The DMRS pattern includes a time-frequency mapping resource of a DMRS within one resource unit. The DMRS pattern includes at least one DMRS basic pattern. For example, one DMRS pattern may include only one DMRS basic pattern, or may include a plurality of same DMRS basic patterns, or may include a plurality of different DMRS basic patterns. The foregoing description is not intended to be limiting with respect to the scope of this application.

It should be understood that, in this embodiment of this application, within a same resource unit, a DMRS basic pattern on a front-part symbol may be the same as or different from a DMRS basic pattern on a rear-part symbol. For example, within a same resource unit, a DMRS basic pattern of a DMRS on a front-part symbol may occupy two symbols, and a DMRS basic pattern of a DMRS on a rear-part symbol may occupy one symbol. The foregoing description is not intended to be limiting with respect to the scope of this application.

With reference to the foregoing possible implementation of the first aspect, in another possible implementation of the first aspect, the first indication information is specifically used to indicate a target DMRS pattern, and a time domain resource that is in the target DMRS pattern and that is used to carry the DMRS is the at least one target time domain resource; and the selecting, by a network device, at least one target time domain resource from a plurality of candidate time domain resources includes: selecting, by the network device, the target DMRS pattern from a plurality of candidate DMRS patterns.

Specifically, the network device may select a target DMRS pattern from a plurality of preset candidate DMRS patterns. A time domain resource that is in the target DMRS pattern and that is used to carry the DMRS is the target time domain resource. In this case, the network device may indicate the target DMRS pattern by using the first indication information.

It should be understood that, the network device may select the target DMRS pattern based on a service requirement or an application scenario of the terminal device, or may select the target DMRS pattern based on a system parameter, that is, a specific frame structure, or may select the target DMRS pattern based on both a service requirement or an application scenario of the terminal device and a system parameter. The foregoing description is not intended to be limiting with respect to the scope of this application.

With reference to the foregoing possible implementations of the first aspect, in another possible implementation of the first aspect, the selecting, by the network device, the target DMRS pattern from a plurality of candidate DMRS patterns includes: determining, by the network device, a quantity of DMRSs; determining, by the network device, at least one DMRS pattern corresponding to the quantity of DMRSs from the plurality of candidate DMRS patterns based on the quantity of DMRSs; and selecting, by the network device, the target DMRS pattern from the at least one DMRS pattern based on a system parameter.

Optionally, the network device may determine, based on a service requirement or an application scenario of the terminal device, a quantity of DMRSs that are required for current transmission, then select at least one DMRS pattern corresponding to the quantity of DMRSs from the plurality of candidate DMRS patterns, and finally select the target DMRS pattern from the at least one DMRS pattern based on a system parameter. Herein, different DMRS patterns in the at least one DMRS pattern may be bound to different system parameters. The system parameter may be a quantity of PDCCHs, a system bandwidth, a frame structure, a DMRS basic pattern, or the like, or may be any other parameter. The foregoing description is not intended to be limiting with respect to the scope of this application. The DMRS basic pattern may specifically occupy one symbol or two symbols in time domain.

Specifically, application scenarios of the terminal device may be distinguished based on a moving speed of the terminal device, and may be classified into a low-speed moving scenario (for example, lower than 30 km/h), a medium-speed moving scenario (for example, 30 km/h to 120 km/h), a high-speed moving scenario (for example, 120 km/h to 500 km/h), and an ultra high-speed moving scenario (for example, greater than 500 km/h). In consideration of data transmission efficiency, an excessively large quantity of DMRSs cannot be placed on a resource unit, otherwise, DMRS redundancy is increased, affecting data transmission. An excessively small quantity of DMRSs leads to a relatively large channel estimation error, affecting transmission performance of a system. Therefore, different quantities of DMRSs may be configured for different application scenarios.

With reference to the foregoing possible implementations of the first aspect, in another possible implementation of the first aspect, before the sending, by the network device, first indication information to a terminal device, the method further includes: sending, by the network device, second indication information to the terminal device, where the second indication information is used to indicate the plurality of candidate DMRS patterns.

It should be understood that, before sending the first indication information to the terminal device, the network device may first configure the plurality of candidate DMRS patterns for the terminal device by using the second indication information, and then perform selection from the plurality of candidate DMRS patterns by using the first indication information. In a possible implementation, the second indication information is carried in radio resource control (RRC) signaling, and the first indication information is carried in downlink control information (DCI) signaling.

With reference to the foregoing possible implementations of the first aspect, in another possible implementation of the first aspect, the first indication information is specifically used to indicate at least one target time domain position corresponding to the at least one target time domain resource; and the selecting, by a network device, at least one target time domain resource from a plurality of candidate time domain resources includes: selecting, by the network device, the at least one target time domain position from a candidate time domain position set, where the candidate time domain position set includes at least one candidate time domain position.

Specifically, the network device may select at least one target time domain position from a preset candidate time domain position set. The at least one target time domain position corresponds to the foregoing target time domain resource. In this case, the network device may indicate the at least one target time domain resource by using the first indication information.

It should be understood that, the network device may select the target DMRS pattern based on a service requirement or an application scenario of the terminal device, or may select the at least one target time domain based on a system parameter, that is, a specific frame structure, or may select the target DMRS pattern or the at least one target time domain based on both a service requirement or an application scenario of the terminal device and a system parameter. The foregoing description is not intended to be limiting with respect to the scope of this application.

In a specific implementation, the candidate DMRS time domain position set may be any one or more of {4, 7, 10, 13}, {4, 11}, {3, 8, 13}, {4, 7, 11, 14}, and {4, 5, 11, 12}.

If there are a plurality of predefined candidate DMRS time domain position sets, where each candidate DMRS time domain position set includes different candidate DMRS time domain positions, the network device may first select a candidate DMRS time domain position set from the plurality of candidate DMRS time domain position sets, and then select at least one candidate time domain position from the selected candidate DMRS time domain position set. The foregoing description is not intended to be limiting with respect to the scope of this application.

It should be understood that, for ease of understanding and description, a representation method of a time domain position in the foregoing set is to correspond to numbers 1 to 14 of time domain resources in a resource unit. When a number of a time domain resource changes, representation of a time domain position in the set may correspondingly change. For example, in addition to being represented by 1 to 14, the time domain resources may be represented by numbers 0 to 13, or represented by using front-part symbols 1 to 7 and rear-part symbols 1 to 7, or represented by using front-part symbols 0 to 6 and rear-part symbols 0 to 6. Therefore, a corresponding representation method may be used for a time domain position in the set. The foregoing description is not intended to be limiting with respect to the scope of this application.

Further, in addition to being directly represented, the foregoing set may be indirectly represented by using a formula or another manner. Using the set {4, 7, 10, 13} as an example, the network device may preconfigure n=4, and then determine a set {n, n+3, n+6, n+9}, or may preconfigure n=10, and then determine a set {n−6, n−3, n, n+3}. It should be understood that, any representation manners may be used herein, and are not listed one by one herein.

It should be understood that, in this embodiment of this application, there may be a scenario in which not all subcarriers in a symbol are occupied by a DMRS basic pattern. In this case, some subcarriers in a symbol that is used to carry the DMRS may be used to transmit data, or may not be used to place data but is used for DMRS power boosting (power boosting). Therefore, for "the time domain resource used to carry a DMRS" in this embodiment of this application, there may be a case in which all subcarriers in a symbol are occupied by a DMRS or a case in which some subcarriers in a symbol are occupied by a DMRS.

With reference to the foregoing possible implementations of the first aspect, in another possible implementation of the first aspect, before the sending, by the network device, first indication information to a terminal device, the method further includes: sending, by the network device, third indication information to the terminal device, where the third indication information is used to indicate the candidate time domain position set.

It should be understood that, before sending the first indication information to the terminal device, the network device may first configure the candidate time domain position set for the terminal device by using the third indication information, and then perform selection from the candidate time domain position set by using the first indication information. In a possible implementation, the third indication information is carried in RRC signaling, and the first indication information is carried in DCI signaling.

With reference to the foregoing possible implementations of the first aspect, in another possible implementation of the first aspect, the first indication information is carried in any one of the following signaling: radio resource control (RRC) signaling, downlink control information (DCI) signaling, and Media Access Control (MAC) control element CE signaling.

It should be understood that, in this embodiment of this application, a time domain position other than a time domain position used to carry a DMRS may be used to transmit data, may be used to transmit another reference signal (RS) (for example, a channel state information-reference signal (CSI-RS)), or a sounding reference signal (SRS)), or may be used to transmit other control signaling. The foregoing description is not intended to be limiting with respect to the scope of this application.

It should be further understood that, there may be no Physical Downlink Control Channel (PDCCH), or a PDCCH may occupy the first one to three symbols within a resource unit. There may be no Physical Uplink Control Channel (PUCCH) used to carry feedback information ACK/NACK, or a PUCCH used to carry feedback information ACK/NACK may occupy the last several symbols within a resource unit. Therefore, when a time domain position of a DMRS pattern configured by the network device and a time domain position of other signaling or another RS conflict, a DMRS may not be placed on a corresponding time domain resource, frequency domain resource, or time-frequency resource. That is, for different frame structures, the DMRS may not be placed on a time domain resource occupied by other control signaling (for example, a PDCCH) or another RS. Specifically, the DMRS may not be placed on a frequency domain position in an occupied symbol, or may not be placed on some occupied frequency domain positions in time domain.

According to a second aspect, another data transmission method is provided. The data transmission method includes: receiving, by a terminal device, first indication information sent by a network device, where the first indication information is used to indicate at least one target time domain resource, the at least one target time domain resource is used to carry a DMRS, and the at least one target time domain resource is selected by the network device from a plurality of candidate time domain resources; and determining, by the terminal device, the at least one target time domain resource according to the first indication information.

According to the data transmission method in this embodiment of this application, a time domain resource that is used to transmit a DMRS between a network device and a terminal device can be flexibly configured, thereby meeting different service requirements of the terminal device.

With reference to the foregoing possible implementation of the second aspect, in another possible implementation of the second aspect, the first indication information is specifically used to indicate a target DMRS pattern, a time domain resource that is in the target DMRS pattern and that is used to carry the DMRS is the at least one target time domain resource, and the target DMRS pattern is selected by the network device from a plurality of candidate DMRS patterns; and the determining, by the terminal device, the at least one target time domain resource according to the first indication information includes: determining, by the terminal device, the at least one target time domain resource based on the target DMRS pattern.

With reference to the foregoing possible implementations of the second aspect, in another possible implementation of the second aspect, before the receiving, by a terminal device, first indication information sent by a network device, the method further includes: receiving, by the terminal device, second indication information sent by the network device, where the second indication information is used to indicate the plurality of candidate DMRS patterns.

With reference to the foregoing possible implementations of the second aspect, in another possible implementation of the second aspect, the first indication information is specifically used to indicate at least one target time domain position corresponding to the at least one target time domain resource, the at least one target time domain position is selected by the network device from a candidate time domain position set, and the candidate time domain position set includes at least one candidate time domain position; and the determining, by the terminal device, the at least one target time domain resource according to the first indication information includes: determining, by the terminal device, the at least one target time domain resource based on the at least one target time domain position.

With reference to the foregoing possible implementations of the second aspect, in another possible implementation of the second aspect, before the receiving, by a terminal device, first indication information sent by a network device, the method further includes: receiving, by the terminal device, third indication information sent by the network device, where the third indication information is used to indicate the candidate time domain position set.

With reference to the foregoing possible implementations of the second aspect, in another possible implementation of the second aspect, the first indication information is carried in any one of the following signaling: radio resource control (RRC) signaling, downlink control information (DCI) signaling, and Media Access Control (MAC) control element (CE) signaling.

In another possible implementation of the second aspect of this application, the network device and the terminal device may select the target time domain resource according to a default rule. In this case, the network device does not need to send indication information to the terminal device, thereby reducing signaling overheads.

The method includes: determining, by a network device, at least one target time domain resource used to carry a DMRS; determining, by a terminal device, the at least one target time domain resource used to carry the DMRS; sending, by the network device, the DMRS by using the at least one target time domain resource, and correspondingly, receiving, by the terminal device, the DMRS by using the at least one target time domain resource; or sending, by the terminal device, the DMRS by using the at least one target time domain resource, and correspondingly, receiving, by the network device, the DMRS by using the at least one target time domain resource.

Optionally, the network device and the terminal device may determine, based on a service requirement or an application scenario of the terminal device or based on another default system parameter, the at least one target time domain resource used to carry the DMRS.

In another aspect of this embodiment of this application, the terminal device may configure, for the network device by using signaling, the time domain resource used to carry the DMRS. The foregoing description is not intended to be limiting with respect to the scope of this application.

According to a third aspect, a network device is provided. The network device is configured to perform the method according to any one of the first aspect or the possible implementations of the first aspect. Specifically, the device includes a unit configured to perform the method according to any one of the first aspect or the possible implementations of the first aspect.

According to a fourth aspect, a terminal device is provided. The terminal device is configured to perform the method according to any one of the second aspect or the possible implementations of the second aspect. Specifically, the device includes a unit configured to perform the method according to any one of the second aspect or the possible implementations of the second aspect.

According to a fifth aspect, a network device is provided. The device includes a transceiver, a memory, and a processor. The transceiver, the memory, and the processor communicate with each other by using an internal connection path. The memory is configured to store an instruction. The processor is configured to execute the instruction stored in the memory, to control a receiver to receive a signal and a transmitter to send a signal. In addition, when the processor executes the instruction stored in the memory, the execution enables the processor to perform the method according to any one of the first aspect or the possible implementations of the first aspect.

According to a sixth aspect, a terminal device is provided. The device includes a transceiver, a memory, and a processor. The transceiver, the memory, and the processor communicate with each other by using an internal connection path. The memory is configured to store an instruction. The processor is configured to execute the instruction stored in the memory, to control a receiver to receive a signal and a transmitter to send a signal. In addition, when the processor executes the instruction stored in the memory, the execution enables the processor to perform the method according to any one of the second aspect or the possible implementations of the second aspect.

According to a seventh aspect, a computer program product is provided. The computer program product includes computer program code. When the computer program code is run on a computer, the computer is enabled to perform the method according to any one of the first aspect or the possible implementations of the first aspect.

According to an eighth aspect, a computer program product is provided. The computer program product includes computer program code. The computer program code is run on a computer, the computer is enabled to perform the method according to any one of the second aspect or the possible implementations of the second aspect.

According to a ninth aspect, a computer-readable medium is provided. The computer-readable medium is configured to store a computer program, where the computer program includes an instruction used to perform the method according to any one of the first aspect or the possible implementations of the first aspect.

According to a tenth aspect, a computer-readable medium is provided. The computer-readable medium is configured to store a computer program, where the computer program includes an instruction used to perform the method according to any one of the second aspect or the possible implementations of the second aspect.

DESCRIPTION OF EMBODIMENTS

Figure 1:
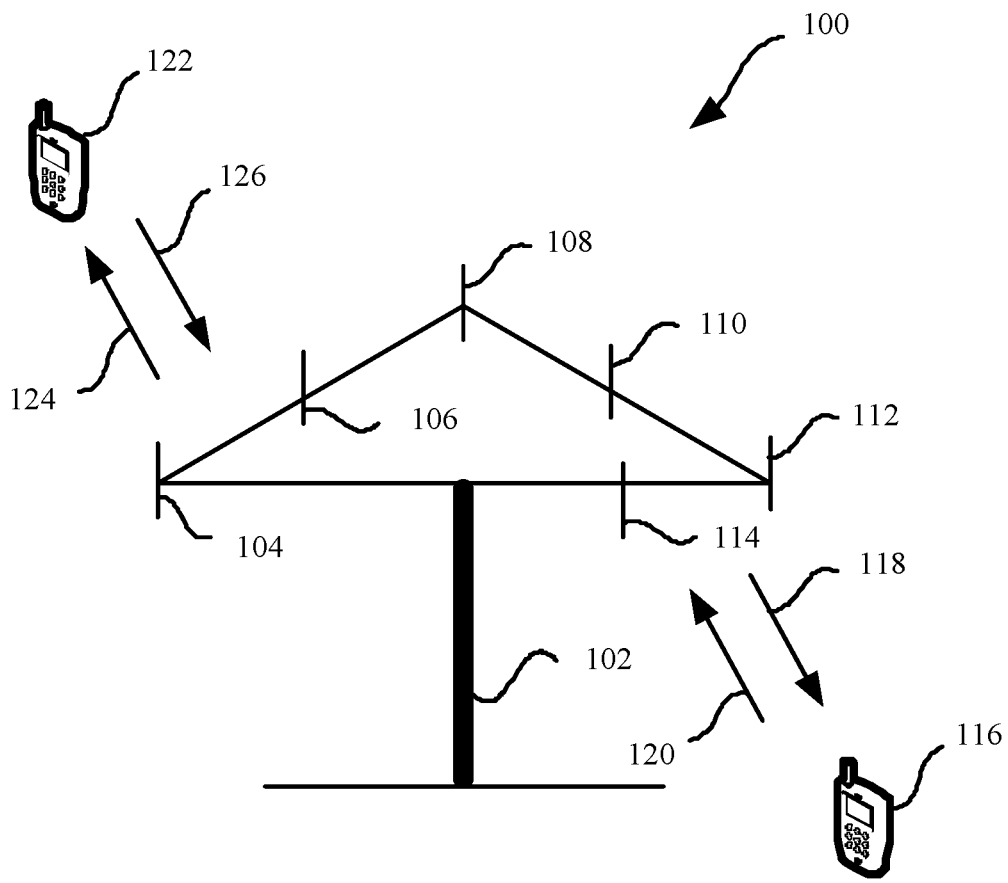
FIG. 1 is a schematic diagram of a communications system according to an embodiment of this application.

The following describes technical solutions in embodiments of this application with reference to the accompanying drawings.

It should be understood that, technical solutions in embodiments of this application may be applied to various communications systems, such as: a Global System for Mobile Communications (GSM) system, a Code Division Multiple Access (CDMA) system, a Wideband Code Division Multiple Access (WCDMA) system, a general packet radio service (GPRS) system, a Long Term Evolution (LTE) system, an LTE frequency division duplex (FDD) system, an LTE time division duplex (TDD) system, a Universal Mobile Telecommunications System (UMTS), a worldwide interoperability for microwave access (WiMAX) communications system, and a future 5G communications system.

It should be further understood that, technical solutions in embodiments of this application may be further applied to various communications systems based on a non-orthogonal multiple access technology, for example, a sparse code multiple access (SCMA) system. Certainly, SCMA may also have another name in the communications field. Further, technical solutions in embodiments of this application may be applied to a multi-carrier transmission system using the non-orthogonal multiple access technology, for example, an orthogonal frequency division multiplexing (OFDM) system, a filter bank multicarrier (FBMC) system, a generalized frequency division multiplexing (GFDM) system, a filtered-orthogonal frequency division multiplexing (F-OFDM) system, or the like that uses the non-orthogonal multiple access technology.

It should be further understood that, a terminal device in embodiments of this application may communicate with one or more core networks by using a radio access network (RAN), and the terminal device may be referred to as an access terminal, user equipment (UE), a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, a terminal device in a future evolved public land mobile network (PLMN), or the like.

It should be further understood that in embodiments of this application, a network device may be configured to communicate with a terminal device. The network device may be a base transceiver station (BTS) in a GSM system or a CDMA system, may be a NodeB (NB) in a WCDMA system, or may be an evolved NodeB (eNB or eNodeB) in an LTE system. Alternatively, the network device may be a relay station, an access point, an in-vehicle device, a wearable device, a network-side device in a future 5G network, or a network device in a future evolved PLMN network, or the like.

Embodiments of this application are applicable to an LTE system and a subsequent evolved system such as a 5G system, or applied to another wireless communications system that uses various radio access technologies, for example, a system that uses an access technology such as Code Division Multiple Access, Frequency Division Multiple Access, Time Division Multiple Access, orthogonal frequency division multiple access, or single carrier frequency division multiple access, and is especially applicable to a scenario in which channel information feedback and/or application of a two-stage precoding technology is required, for example, applicable to a wireless network using a massive MIMO technology or a wireless network using a distributed antenna technology.

It should be understood that, in a multiple-input multiple-output (MIMO) technology, a plurality of antennas are used for both a transmit-end device and a receive-end device, so that signals are transmitted and received by using the plurality of antennas at the transmit-end device and the receive-end device, to improve communication quality. The multiple-input multiple-output technology can fully use a space resource and implement multiple-input multiple-output by using the plurality of antennas, and can multiply a system channel capacity without an increase in spectrum resources and antenna transmit power.

MIMO may be classified into single-user multiple-input multiple-output (SU-MIMO) and multi-user multiple-input multiple-output (MU-MIMO). In massive MIMO, hundreds of antennas are deployed at the transmit-end device according to a multi-user beamforming principle, a beam is modulated for each of dozens of target receivers, and dozens of signals are concurrently transmitted on a same frequency resource by multiplexing signals in space domain. Therefore, the massive MIMO technology can make full use of a spatial degree of freedom brought by a configuration of massive antennas, to improve spectral efficiency.

FIG. 1 is a schematic diagram of a communications system 100 applied in an embodiment of this application. As shown in FIG. 1, the communications system 100 includes a network device 102, and the network device 102 may include a plurality of antenna groups. Each antenna group may include one or more antennas. For example, one antenna group may include antennas 104 and 106, another antenna group may include antennas 108 and 110, and an additional group may include antennas 112 and 114. FIG. 1 shows that each antenna group has two antennas. However, more or fewer antennas may be used for each group. The network device 102 may additionally include a transmitter chain and a receiver chain. A person of ordinary skill in the art may understand that the transmitter chain and the receiver chain may both include a plurality of components related to signal sending and receiving, for example, a processor, a modulator, a multiplexer, a demodulator, a demultiplexer, or an antenna.

The network device 102 may communicate with a plurality of terminal devices. For example, the network device 102 may communicate with a terminal device 116 and a terminal device 122. However, it may be understood that the network device 102 may communicate with any quantity of terminal devices similar to the terminal device 116 or 122. The terminal devices 116 and 122 may be, for example, a cellular phone, a smartphone, a portable computer, a handheld communications device, a handheld computing device, a satellite radio apparatus, a global positioning system, a PDA, and/or any other suitable devices used for communication in the communications system 100.

As shown in FIG. 1, the terminal device 116 communicates with the antennas 112 and 114. The antennas 112 and 114 send information to the terminal device 116 through a forward link 118, and receive information from the terminal device 116 through a reverse link 120. In addition, the terminal device 122 communicates with the antennas 104 and 106. The antennas 104 and 106 send information to the terminal device 122 through a forward link 124, and receive information from the terminal device 122 through a reverse link 126.

For example, in a frequency division duplex (FDD) system, the forward link 118 may use a frequency band different from a frequency band used by the reverse link 120, and the forward link 124 may use a frequency band different from a frequency band used by the reverse link 126.

For another example, in a time division duplex (TDD) system and a full duplex system, the forward link 118 and the reverse link 120 may use a same frequency band, and the forward link 124 and the reverse link 126 may use a same frequency band.

Each group of antennas and/or an area designed for communication is referred to as a sector of the network device 102. For example, an antenna group may be designed to communicate with a terminal device in a sector within coverage of the network device 102. In a process in which the network device 102 communicates with the terminal devices 116 and 122 respectively through the forward links 118 and 124, transmit antennas of the network device 102 may improve signal-to-noise ratios of the forward links 118 and 124 through beamforming. In addition, compared with a manner in which the network device sends, by using a single antenna, a signal to all terminal devices served by the network device, when the network device 102 sends, through beamforming, a signal to the terminal devices 116 and 122 that are randomly distributed within related coverage, less interference is caused to a mobile device in a neighboring cell.

In a given time, the network device 102, the terminal device 116, or the terminal device 122 may be a wireless communications sending apparatus and/or a wireless communications receiving apparatus. When sending data, the wireless communications sending apparatus may encode the data for transmission. Specifically, the wireless communications sending apparatus may obtain a specified quantity of data bits to be sent to the wireless communications receiving apparatus through a channel. For example, the wireless communications sending apparatus may generate, receive from another communications apparatus, or store in a memory, the specified quantity of data bits to be sent to the wireless communications receiving apparatus through the channel. Such data bits may be included in a transport block or a plurality of transport blocks of data, and the transport block may be segmented to generate a plurality of code blocks.

In addition, the communications system 100 may be a public land mobile network (PLMN), or a device to device (D2D) network, or a machine to machine (M2M) network, or another network. FIG. 1 is only an example simplified schematic diagram for ease of understanding. The network may further include another network device, and the another network device is not shown in FIG. 1.

The following first briefly describes a resource unit in this specification.

The resource unit is similar to an RB or RB pair in an LTE standard. The resource unit may be used as a basic unit for resource allocation during terminal scheduling, or may be used to describe an arrangement manner of various types of reference signals.

The resource unit may include a plurality of contiguous subcarriers in frequency domain and one time interval (TI) in time domain. In different scheduling processes, resource units may have a same size or different sizes. The TI herein may be a transmission time interval (TTI) in an LTE system, or may be a symbol-level short TTI, or a short TTI with a large subcarrier spacing in a high-frequency system, or may be a slot or a mini-slot in a 5G system, or the like. The foregoing description is not intended to be limiting with respect to the scope of this application.

Figure 2:
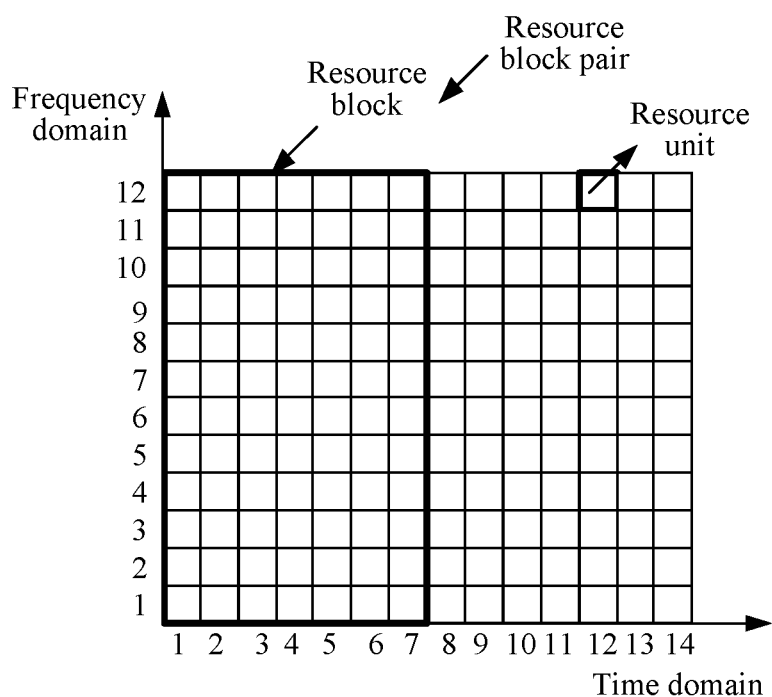
FIG. 2 is a schematic diagram of a resource unit according to an embodiment of this application.

Optionally, one resource unit may include one or more RBs, one or more RB pairs, or the like. In addition, the resource unit may alternatively be half an RB. In addition, the resource unit may alternatively be another time-frequency resource. The foregoing description is not intended to be limiting with respect to the scope of this application. One RB pair includes 12 contiguous subcarriers in frequency domain and one subframe in time domain. A time-frequency resource that includes one subcarrier in frequency domain and one symbol in time domain is a resource element (RE), as shown in FIG. 2. An RB pair in FIG. 2 includes 12 contiguous subcarriers (numbered 1 to 12) in frequency domain and 14 symbols (numbered 1 to 14) in time domain. In FIG. 2, a horizontal coordinate represents the time domain, and a vertical coordinate represents the frequency domain. It should be noted that all accompanying drawings including a time domain resource in this application are described by using an RB pair in FIG. 2 as an example. The foregoing description is not intended to be limiting with respect to the scope of this application.

It should be understood that, the "symbol" in this application may include, but is not limited to, any of the following: an orthogonal frequency division multiplexing (OFDM) symbol, a universal filtered multi-carrier (UFMC) symbol, a filter bank multicarrier (FBMC) symbol, a generalized frequency division multiplexing (GFDM) symbol, or the like.

For ease of description, a concept of a DMRS basic pattern is introduced to this specification. The DMRS basic pattern may be understood as a DMRS pattern that is on a specified quantity of consecutive symbols in time domain within a resource unit and that can support a maximum quantity of ports. It should be noted that the scope of this application is not intended to be limited to a specific symbol position of the DMRS basic pattern. For example, the DMRS basic pattern may be front-loaded, or may be backward-loaded. The scope of this application is not intended to be limited to a specific quantity of symbols of the DMRS basic pattern either. For example, the DMRS basic pattern may occupy one symbol, or may occupy two symbols. Further, the scope of this application is not intended to be limited to a port multiplexing mode of the DMRS basic pattern either.

Figure 3:
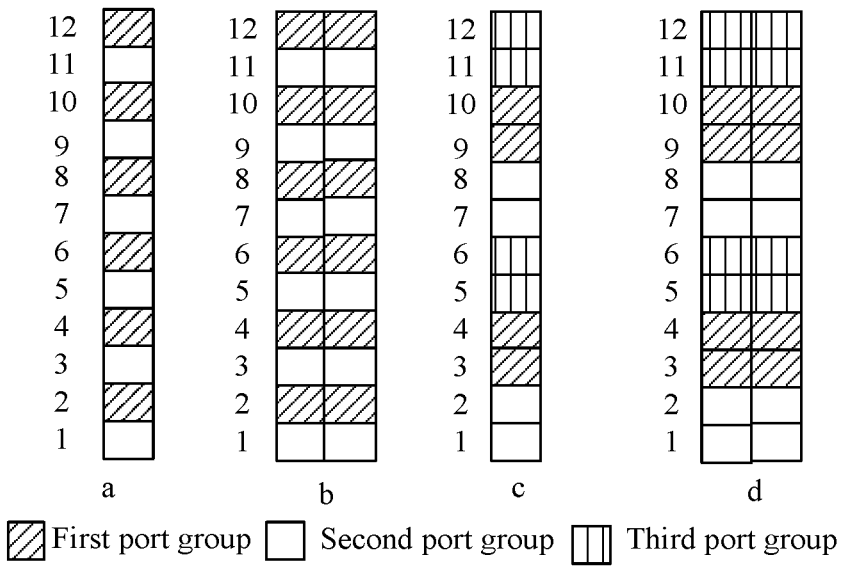
FIG. 3 is a schematic diagram of a DMRS basic pattern according to an embodiment of this application.

FIG. 3 is a specific schematic diagram of four DMRS basic patterns. However, it should be understood that, this is not intended to be limiting with respect to the scope of this application.

(a) Four DMRS ports are mapped to one symbol. The four DMRS ports are divided into two groups, DMRS ports in each group are multiplexed on a same time-frequency resource through code division multiplexing (CDM) (cyclic shift (CS) or orthogonal cover code (OCC)), and the two groups of DMRS ports are multiplexed through frequency division multiplexing (FDM).

(b) Eight DMRS ports are mapped to two consecutive symbols. The eight DMRS ports are divided into two groups, DMRS ports in each group are multiplexed on a same time-frequency resource through CDM (CS+OCC or OCC), and the two groups of DMRS ports are multiplexed through FDM.

(c) Six DMRS ports are mapped to one symbol. The six DMRS ports are divided into three groups, DMRS ports in each group are multiplexed on a same time-frequency resource through CDM (OCC or CS), and the three groups of DMRS ports are multiplexed through FDM.

(d) 12 DMRS ports are mapped to two consecutive symbols. The 12 DMRS ports are divided into three groups, DMRS ports in each group are multiplexed on a same time-frequency resource through CDM (OCC or CS+OCC), and the three groups of DMRS ports are multiplexed through FDM.

It should be understood that, concepts such as a DMRS and a quantity of DMRSs in this specification are all specific to a DMRS basic pattern. To be specific, one DMRS is one DMRS basic pattern, and a quantity of DMRSs is a quantity of DMRS basic patterns.

In addition, for ease of understanding, a concept of a DMRS pattern is introduced to this specification. The DMRS pattern includes a time-frequency mapping resource of a DMRS within one resource unit. The DMRS pattern includes at least one DMRS basic pattern. For example, one DMRS pattern may include only one DMRS basic pattern, or may include a plurality of same DMRS basic patterns, or may include a plurality of different DMRS basic patterns. The foregoing description is not intended to be limiting with respect to the scope of this application.

For ease of understanding, the following first describes some points.

1. In this application, for ease of description, symbols included in time domain within one resource unit are consecutively numbered from 1, and subcarriers included in frequency domain are numbered from 1. For example, using an example in which one resource unit is one RB pair, the RB pair may include symbols 1 to 14 in time domain, and may include subcarriers 1 to 12 in frequency domain. The foregoing description is not intended to be limiting with respect to the scope of this application. It should be noted that, the foregoing describes all settings made to describe technical solutions provided in this embodiment of this application, rather than limit the scope of this application.

2. A DMRS may be mapped to at least one symbol within the resource unit. Optionally, the at least one symbol may be a front-part symbol or a rear-part symbol within the resource unit. The front-part symbol is a symbol located in front within the resource unit, and may be, for example, a symbol located before a symbol numbered 7 (that is, the seventh symbol) in FIG. 2. Specific symbols in a subframe as which front-part symbols are defined are not intended to be limiting with respect to the scope of this application. Alternatively, the at least one symbol may be a rear-part symbol. The rear-part symbol is a symbol located after the symbol numbered 7 in FIG. 2. Specific symbols in a subframe as which rear-part symbols are defined are not intended to be limiting with respect to the scope of this application. It may be understood that, during actual implementation, if the DMRS is mapped to a plurality of symbols, the plurality of symbols may be symbols of a same type, or may be symbols of different types. The type includes a front-part symbol type and a rear-part symbol type. For example, all of the plurality of symbols are front-part symbols, or some of the plurality of symbols are front-part symbols and the other symbols are rear-part symbols.

In addition, in this embodiment of this application, if the DMRS is mapped to a plurality of symbols, the plurality of symbols may be consecutive or discrete. To be specific, the plurality of symbols may be adjacent symbols, or may not be adjacent symbols. It may be understood that, in this application, some or all DMRSs may be mapped to front-part symbols. In this way, compared with the prior art, a receiving device can finish receiving the DMRSs more quickly to start data demodulation, thereby meeting a requirement for fast data demodulation in NR.

3. In this application, several mapping rules between a DMRS and a time domain resource are schematically shown. The mapping rules may be specifically shown by using a DMRS pattern. During specific implementation, the mapping rules may be implemented in a form of formulas, tables, or another manner. During specific implementation, a terminal device may learn, according to a rule agreed with a network device or based on information used to indicate a time-frequency resource corresponding to a DMRS, of the time-frequency resource corresponding to the DMRS. For example, the network device may configure a DMRS pattern on a front-part symbol for the terminal device by using radio resource control (RRC) signaling, and then additionally configure a DMRS pattern on a rear-part symbol by using downlink control information (DCI). The network device may alternatively indicate a quantity of DMRSs by using indication information, and the terminal device selects a DMRS pattern corresponding to the quantity of DMRSs. In addition, the network device may alternatively directly configure the DMRS pattern by using RRC signaling. The foregoing description is not intended to be limiting with respect to the scope of this application. The terminal device may obtain the DMRS from the time-frequency resource by using a method in the prior art.

Technical solutions provided in this application may be applied to a single carrier transmission scenario, or may be applied to a multi-carrier transmission scenario; and may be applied to an uplink transmission scenario, or may be applied to a downlink transmission scenario. In addition, technical solutions provided in this application are applicable to a broadcast/multicast physical downlink shared channel (PDSCH), a physical broadcast channel (PBCH), or the like. The foregoing description is not intended to be limiting with respect to the scope of this application.

Figure 4:
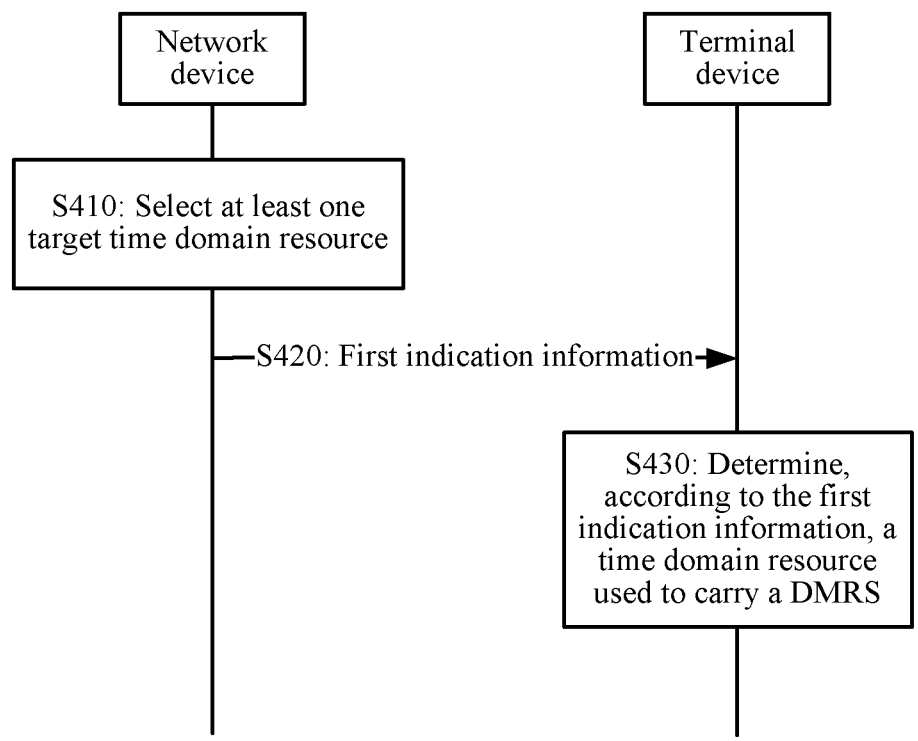
FIG. 4 is a schematic flowchart of a data transmission method according to an embodiment of this application.

FIG. 4 is a schematic flowchart of a data transmission method 400 according to an embodiment of this application. The method 400 may be applied to the communications system 100 shown in FIG. 1. The foregoing description is not intended to be limiting with respect to the scope of this application.

S410: A network device selects at least one target time domain resource from a plurality of candidate time domain resources, where the at least one target time domain resource is used to carry a DMRS.

Optionally, the network device may select the at least one target time domain resource from the plurality of candidate time domain resources based on a service requirement or an application scenario of a terminal device.

S420: The network device sends first indication information to the terminal device, where the first indication information is used to indicate the at least one target time domain resource.

S430: The terminal device receives the first indication information sent by the network device, and determines the at least one target time domain resource according to the first indication information.

In an optional embodiment, the first indication information is carried in any one of the following signaling: radio resource control (RRC) signaling, downlink control information (DCI) signaling, and Media Access Control (MAC) control element (CE) signaling.

Optionally, after both the network device and the terminal device determine the target time domain resource used to carry the DMRS, the network device may send the DMRS by using the target time domain resource, and correspondingly, the terminal device receives the DMRS by using the target time domain resource; or the terminal device sends the DMRS by using the target time domain resource, and correspondingly, the network device receives the DMRS by using the target time domain resource. The foregoing description is not intended to be limiting with respect to the scope of this application.

Specifically, the network device may select the at least one target time domain resource from the plurality of candidate time domain resources, and send the first indication information to the terminal device to indicate the at least one target time domain resource. The terminal device determines, based on a configuration of the network device, the target time domain resource used to carry the DMRS, and transmits the DMRS to the network device by using the target time domain resource. The DMRS is carried in at least one resource unit. For a feature of a time domain resource occupied by the DMRS in each resource unit, refer to a feature of a time domain resource occupied by any DMRS in any of FIG. 6 to FIG. 60 and related descriptions.

It should be understood that, the foregoing service requirement may be a requirement for fast data demodulation, or may be a requirement for high data transmission performance, or may be another particular requirement. The foregoing description is not intended to be limiting with respect to the scope of this application. The foregoing application scenario may be a current moving scenario of the terminal device that is determined based on a channel changing status of the terminal device, such as a high-speed moving scenario, a medium-speed moving scenario, or a low-speed moving scenario, or may be different frame structures such as current frame feedback or non-current frame feedback. The foregoing description is not intended to be limiting with respect to the scope of this application.

According to the data transmission method in this embodiment of this application, a time domain resource that is used to transmit a DMRS between a network device and a terminal device can be flexibly configured, thereby meeting different service requirements of the terminal device.

Ultra-reliable and low latency communications requires a receiving device to fast demodulate and fast feedback data. Therefore, a DMRS needs to be placed on a front-part symbol within a resource unit, so that the receiving device can estimate a channel earlier and can therefore decode received data in real time. It should be understood that, the receiving device may be the network device, or may be the terminal device.

Optionally, the application scenario of the terminal device may be distinguished based on a moving speed of the terminal device, and may be divided into a low-speed moving scenario (for example, lower than 30 km/h), a medium-speed moving scenario (for example, 30 km/h to 120 km/h), a high-speed moving scenario (for example, 120 km/h to 500 km/h), and an ultra high-speed moving scenario (for example, greater than 500 km/h). In consideration of data transmission efficiency, an excessively large quantity of DMRSs cannot be placed on a resource unit, otherwise, DMRS redundancy is increased, affecting data transmission. An excessively small quantity of DMRSs leads to a relatively large channel estimation error, affecting transmission performance of a system. Therefore, different quantities of DMRSs may be configured for different application scenarios.

Specifically, for the high-speed moving scenario, for example, on a high-speed railway or a highway, a channel quickly changes in time domain. Consequently, a high speed channel cannot be accurately sampled if DMRSs are placed on only a front-part symbol within a resource unit. In this case, in addition to placing a DMRS on the front-part symbol within the resource unit, DMRSs need to be added to a rear-part symbol within the resource unit. It should be understood that, a position of a DMRS directly affects performance of a system. If the DMRS is closer to the end, it indicates more accurate channel estimation and a later time at which the receiving device demodulates data. On the contrary, a DMRS closer to the beginning indicates an earlier time at which the receiving device demodulates the data and a larger channel estimation error. Therefore, in a possible implementation, for the low-speed moving scenario, a DMRS needs to placed on only a front-part symbol within a resource unit; for the medium-speed moving scenario, in addition to placing a DMRS on a front-part symbol within a resource unit, one DMRS needs to be placed on a rear-part symbol within the resource unit; for the high-speed moving scenario, in addition to placing a DMRS on a front-part symbol within a resource unit, one or two DMRSs need to be placed on a rear-part symbol within the resource unit; for the ultra high-speed moving scenario, in addition to placing a DMRS on a front-part symbol within a resource unit, two or three DMRSs need to be placed on a rear-part symbol within the resource unit.

A method for determining a time domain resource used to carry a DMRS is provided herein. In this embodiment of this application, the DMRS pattern may not have a binding relationship with a moving speed or a specific application scenario of the terminal device.

In addition, a frame structure may be classified into current frame feedback and non-current frame feedback. For a frame structure of the current frame feedback, feedback information ACK/NACK needs to be placed on the last several symbols (for example, the last two symbols or the last three symbols) within a resource unit. Therefore, a case in which DMRSs are placed on the last several symbols within the resource unit that are used to place the feedback information should be avoided. For a frame structure of the non-current frame feedback, for a current frame, if a transmission result of the frame does not need to be fed back, and a transmission result of a former frame within the resource unit does not need to be fed back either, a DMRS may be placed on the last several symbols within the resource unit that are used to place the feedback information. The foregoing description is not intended to be limiting with respect to the scope of this application.

It should be understood that, if the technical solution is applied to an uplink transmission scenario, a sending device may be the terminal device, and a receiving device may be the network device. If the technical solution is applied to a downlink transmission scenario, a sending device may be the network device, and a receiving device may be the terminal device.

It should be noted that the scope of this application is not intended to be limited to a specific quantity of symbols of a DMRS basic pattern. For example, there may be specifically one symbol or two symbols of the DMRS basic pattern. Particularly, when a DMRS occupies two symbols, a forward-loading or backward-loading manner may be used, to place a DMRS in a corresponding time domain position. Forward-loading or backward-loading herein means that sorting is performed based on absolute port numbers of DMRS ports. Specifically, backward-loading means that DMRS ports are mapped, in ascending order of absolute port numbers, from a symbol located in front and occupied by a basic pattern in time domain to a symbol located behind and occupied by the basic symbol in time domain. Similarly, forward-loading means that DMRS ports are mapped, in ascending order of absolute port numbers, from a symbol located behind in time domain to a symbol located in front and occupied by a basic pattern in time domain. The foregoing description is not intended to be limiting with respect to the scope of this application. A mapping manner of a DMRS may be understood as a mapping order of a DMRS port.

It should be further understood that, the sending device and the receiving device may determine, in a plurality of manners, the target time domain resource used to carry the DMRS. The foregoing description is not intended to be limiting with respect to the scope of this application.

In an optional embodiment, the first indication information is specifically used to indicate a target DMRS pattern, and a time domain resource that is in the target DMRS pattern and that is used to carry the DMRS is the at least one target time domain resource, and the selecting, by a network device, at least one target time domain resource from a plurality of candidate time domain resources includes: selecting, by the network device, the target DMRS pattern from a plurality of candidate DMRS patterns.

Specifically, the network device may select a target DMRS pattern from a plurality of preset candidate DMRS patterns. A time domain resource that is in the target DMRS pattern and that is used to carry the DMRS is the target time domain resource. In this case, the network device may indicate the target DMRS pattern by using the first indication information.

It should be understood that, the network device may select the target DMRS pattern based on a service requirement or an application scenario of the terminal device, or may select the target DMRS pattern based on a system parameter, that is, a specific frame structure, or may select the target DMRS pattern based on both a service requirement or an application scenario of the terminal device and a system parameter. The foregoing description is not intended to be limiting with respect to the scope of this application.

In a specific implementation, a candidate DMRS time domain position set may be any one or more of {4, 7, 10, 13}, {4, 11}, {3, 8, 13}, {4, 7, 11, 14}, and {4, 5, 11, 12}. Although in the following embodiments, only some special examples are used for description, it should be understood that, the scope of this application is not intended to be limited to a specific quantity of candidate DMRS time domain position sets.

In an optional embodiment, the selecting, by the network device, the target DMRS pattern from a plurality of candidate DMRS patterns includes: determining, by the network device, a quantity of DMRSs; determining, by the network device, at least one DMRS pattern corresponding to the quantity of DMRSs from the plurality of candidate DMRS patterns based on the quantity of DMRSs; and selecting, by the network device, the target DMRS pattern from the at least one DMRS pattern based on a system parameter.

Specifically, the network device may determine, based on a service requirement or an application scenario of the terminal device, a quantity of DMRSs that are required for current transmission, then select at least one DMRS pattern corresponding to the quantity of DMRSs from the plurality of candidate DMRS patterns, and finally select the target DMRS pattern from the at least one DMRS pattern based on a system parameter. Herein, different DMRS patterns in the at least one DMRS pattern may be bound to different system parameters. The system parameter may be a quantity of PDCCHs, a system bandwidth, a frame structure, a DMRS basic pattern, or the like, or may be any other parameter. The foregoing description is not intended to be limiting with respect to the scope of this application. The DMRS basic pattern may specifically occupy one symbol or two symbols in time domain.

In an optional embodiment, before the network device sends the first indication information to the terminal device, the method further includes:

sending, by the network device, second indication information to the terminal device, where the second indication information is used to indicate the plurality of candidate DMRS patterns.

It should be understood that, before sending the first indication information to the terminal device, the network device may first configure the plurality of candidate DMRS patterns for the terminal device by using the second indication information, and then perform selection from the plurality of candidate DMRS patterns by using the first indication information. In a possible implementation, the second indication information is carried in RRC signaling, and the first indication information is carried in DCI signaling.

In an optional embodiment, the first indication information is specifically used to indicate at least one target time domain position corresponding to the at least one target time domain resource; and that the network device selects the at least one target time domain resource from the plurality of candidate time domain resources includes: selecting, by the network device, the at least one target time domain position from a candidate time domain position set, where the candidate time domain position set includes at least one candidate time domain position.

Specifically, the network device may select at least one target time domain position from a preset candidate time domain position set. The at least one target time domain position corresponds to the foregoing target time domain resource. In this case, the network device may indicate the at least one target time domain resource by using the first indication information.

It should be understood that, the network device may select the target DMRS pattern based on a service requirement or an application scenario of the terminal device, or may select the at least one target time domain based on a system parameter, that is, a specific frame structure, or may select the target DMRS pattern or the at least one target time domain based on both a service requirement or an application scenario of the terminal device and a system parameter. The foregoing description is not intended to be limiting with respect to the scope of this application.

In an optional embodiment, before the network device sends the first indication information to the terminal device, the method further includes: sending, by the network device, third indication information to the terminal device, where the third indication information is used to indicate the candidate time domain position set.

It should be understood that, before sending the first indication information to the terminal device, the network device may first configure the candidate time domain position set for the terminal device by using the third indication information, and then perform selection from the candidate time domain position set by using the first indication information. In a possible implementation, the third indication information is carried in RRC signaling, and the first indication information is carried in DCI signaling.

The foregoing embodiment describes only a case in which the network device configures, for the terminal device by using signaling, a time domain position used to carry a DMRS. However, it should be understood that, the terminal device may also configure, for the network device by using signaling, a time domain position used to carry a DMRS. Because of similar principles, details are not described herein.

Figure 5:
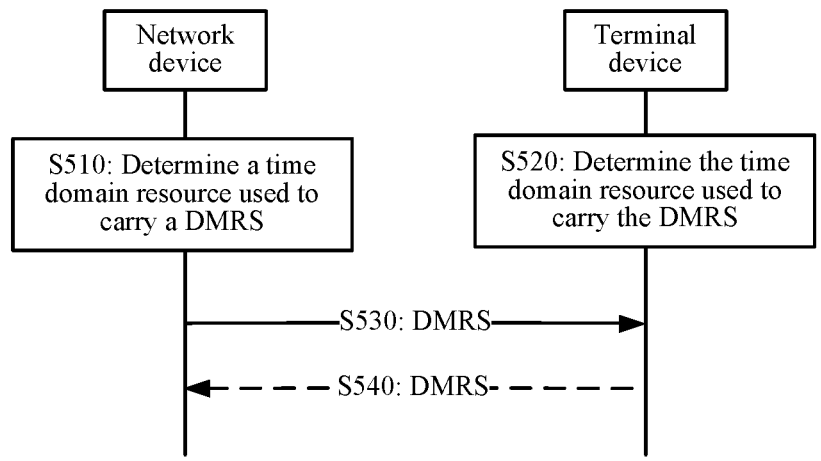
FIG. 5 is a schematic flowchart of another data transmission method according to an embodiment of this application.

FIG. 5 is a schematic flowchart of another data transmission method 500 according to an embodiment of this application. The method 500 may be applied to the communications system 100 shown in FIG. 1. The foregoing description is not intended to be limiting with respect to the scope of this application.

S510: A network device determines at least one target time domain resource used to carry a DMRS.

Optionally, the network device may determine, based on a service requirement or an application scenario of a terminal device, the at least one target time domain resource used to carry the DMRS.

S520: The terminal device determines the at least one target time domain resource used to carry the DMRS.

Optionally, the terminal device may determine, based on the service requirement or the application scenario of the terminal device, the at least one target time domain resource used to carry the DMRS.

S530: The network device sends the DMRS by using the at least one target time domain resource, and correspondingly, the terminal device receives the DMRS by using the at least one target time domain resource; or S540: The terminal device sends the DMRS by using the at least one target time domain resource, and correspondingly, the network device receives the DMRS by using the at least one target time domain resource.

Specifically, the network device and the terminal device may determine, according to a preset rule, for example, the service requirement or the application scenario of the terminal device, the target time domain resource used to carry the DMRS, and use the target time domain resource to transmit the DMRS. The DMRS is carried in at least one resource unit. For a feature of a time domain resource occupied by the DMRS in each resource unit, refer to a feature of a time domain resource occupied by any DMRS in any of FIG. 6 to FIG. 60 and related descriptions.

It should be understood that, the foregoing service requirement may be a requirement for fast data demodulation, or may be a requirement for high data transmission performance, or may be another particular requirement. The foregoing description is not intended to be limiting with respect to the scope of this application. The foregoing application scenario may be a current moving scenario of the terminal device that is determined based on a channel changing status of the terminal device, such as a high-speed moving scenario, a medium-speed moving scenario, or a low-speed moving scenario, or may be different frame structures such as current frame feedback or non-current frame feedback. The foregoing description is not intended to be limiting with respect to the scope of this application.

According to the data transmission method in this embodiment of this application, a time domain resource that is used to transmit a DMRS between a network device and a terminal device can be flexibly configured, thereby meeting different service requirements of the terminal device.

Another method for determining a time domain resource used to carry a DMRS is provided herein. In this embodiment of this application, a DMRS pattern may not have a binding relationship with a moving speed or a specific application scenario of the terminal device.

It should be further understood that, the network device and the terminal device may determine, in a plurality of manners, the target time domain resource used to carry the DMRS. The foregoing description is not intended to be limiting with respect to the scope of this application.

In an optional embodiment, that the network device selects the at least one target time domain resource from a plurality of candidate time domain resources includes: selecting, by the network device, a target DMRS pattern from a plurality of candidate DMRS patterns, where a time domain resource that is in the target DMRS pattern and that is used to carry the DMRS is the at least one target time domain resource.

In an optional embodiment, the selecting, by the network device, a target DMRS pattern from a plurality of candidate DMRS patterns includes: determining, by the network device, a quantity of DMRSs; determining, by the network device, at least one DMRS pattern corresponding to the quantity of DMRSs from the plurality of candidate DMRS patterns based on the quantity of DMRSs; and selecting, by the network device, the target DMRS pattern from the at least one DMRS pattern based on a system parameter.

In an optional embodiment, that the network device selects the at least one target time domain resource from a plurality of candidate time domain resources includes: selecting, by the network device, at least one target time domain position from a candidate time domain position set, where the candidate time domain position set includes at least one candidate time domain position, and the at least one candidate time domain position corresponds to the at least one target time domain resource.

It should be understood that, a specific manner in which the terminal device determines the target time domain resource may be the same as a manner in which the network device determines the target time domain resource, and details are not described herein.

For ease of understanding, an example in which the network device configures a DMRS pattern for the terminal device is used below for description. The foregoing description is not intended to be limiting with respect to the scope of this application.

A possible implementation of this embodiment of this application is described in detail below with reference to FIG. 6 to FIG. 35.

For a predefined candidate DMRS time domain position set, a plurality of candidate DMRS time domain positions included in the set are numbers of time domain resources. The network device may select at least one time domain position from the set to place a DMRS, so that a mapped DMRS pattern is applicable to different scenarios and different frame structures, and meets different service requirements.

1. The candidate DMRS time domain position set is {4, 7, 10, 13}.

Specifically, FIG. 6 to FIG. 13 each are a schematic diagram of a DMRS pattern in which each DMRS basic pattern occupies one symbol.

Figure 6:
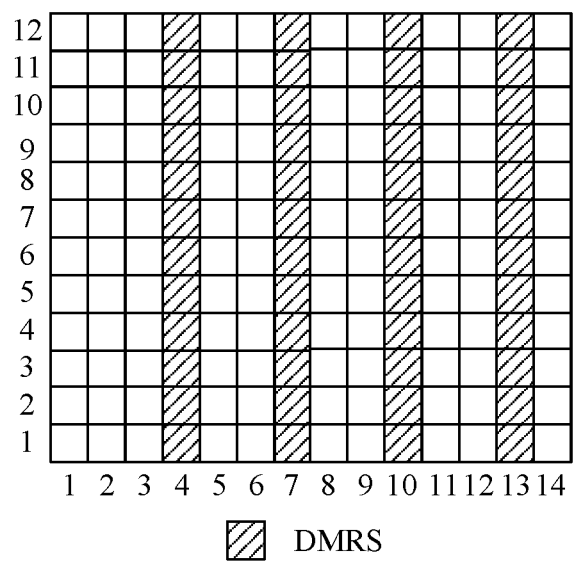
FIG. 6 to FIG. 35 each are a schematic diagram of a DMRS pattern according to an embodiment of this application.

In FIG. 6, a symbol 4, a symbol 7, a symbol 10, and a symbol 13 are used to carry a DMRS. Such a design can ensure even distribution of a pilot density in time domain and even interpolation in time domain, thereby ensuring channel estimation performance in an ultra high-speed scenario. In addition, such a design is applicable to a 3-PDCCH frame structure.

Figure 7:
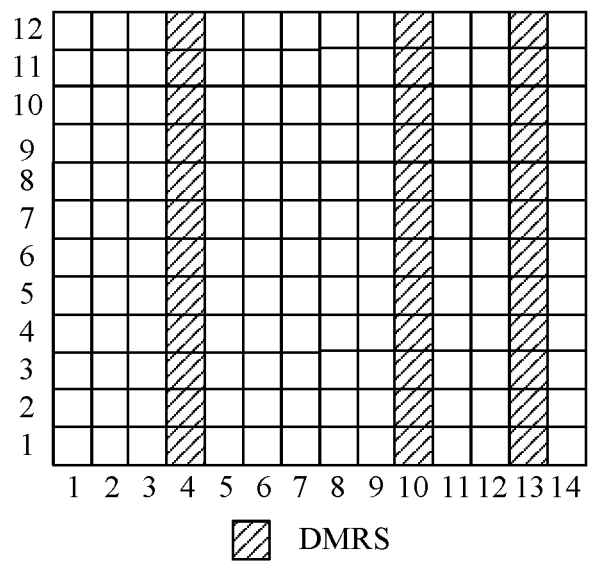

In FIG. 7, a symbol 4, a symbol 10, and a symbol 13 are used to carry a DMRS. Compared with FIG. 6, in such a design, more data can be transmitted, and channel interpolation can still be ensured in a high-speed scenario, thereby providing better channel estimation performance.

Figure 8:
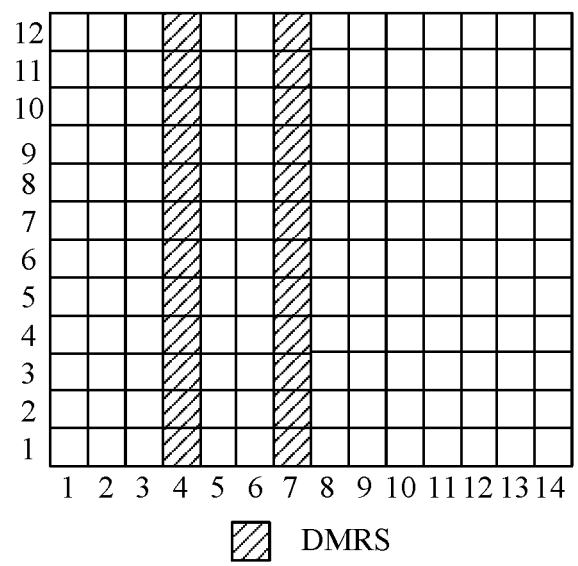

In FIG. 8, a symbol 4 and a symbol 7 are used to carry a DMRS. Such a design can meet a requirement for fast feedback in a moving scenario, so that a receiving device can receive a DMRS earlier, to complete channel estimation, decode received data in real time, and perform uplink feedback in a current frame.

Figure 9:
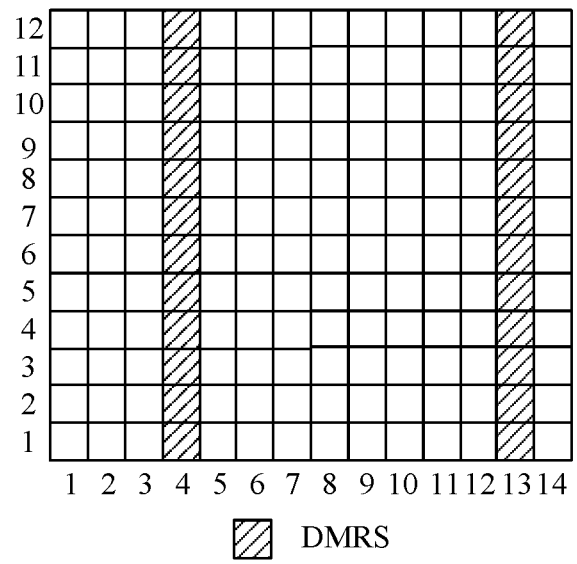

In FIG. 9, a symbol 4 and a symbol 13 are used to carry a DMRS. Such a design can be effectively applied to a medium-speed scenario, and provide better channel estimation performance through interpolation in time domain. In addition, such a design occupies less resources, thereby improving spectral efficiency.

Figure 10:
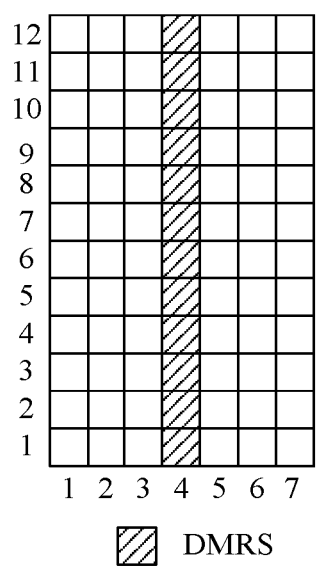

In FIG. 10, a symbol 4 is used to carry a DMRS. Such a design may be applied to a 7-symbol frame structure. This can reduce overheads, and can satisfy a 3-PDCCH scenario or 2-PDCCH uplink scenario.

Figure 11:
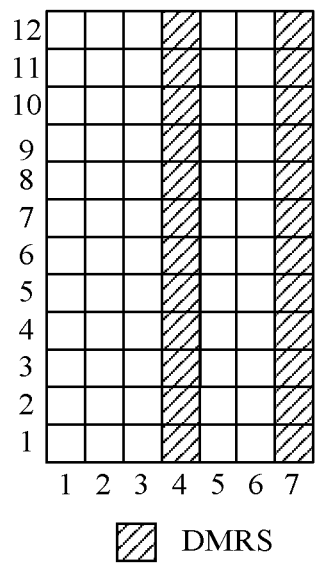

In FIG. 11, a symbol 4 and a symbol 7 are used to carry a DMRS. Such a design can satisfy a high-speed moving scenario of a 7-symbol frame structure, and ensure channel estimation precision through DMRS interpolation in time domain.

Figure 12:
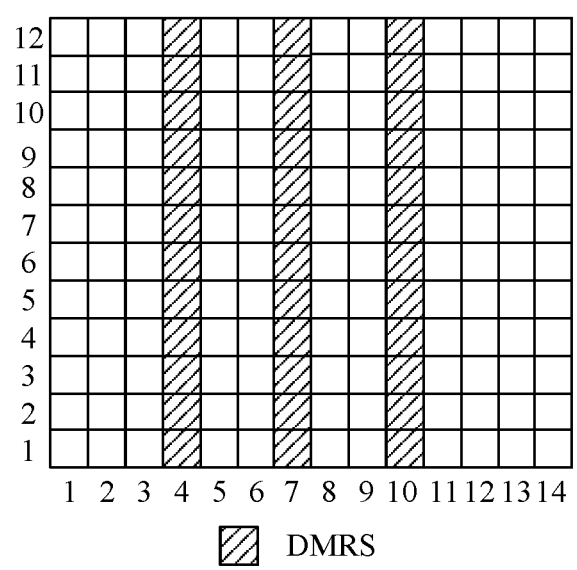

In FIG. 12, a symbol 4, a symbol 7, and a symbol 10 are used to carry a DMRS. Such a design is applicable to a high-speed scenario with a PUCCH, so that the DMRS is not placed at a time domain position at which the PUCCH possibly exists, and interpolation in time domain can be satisfied.

Figure 13:
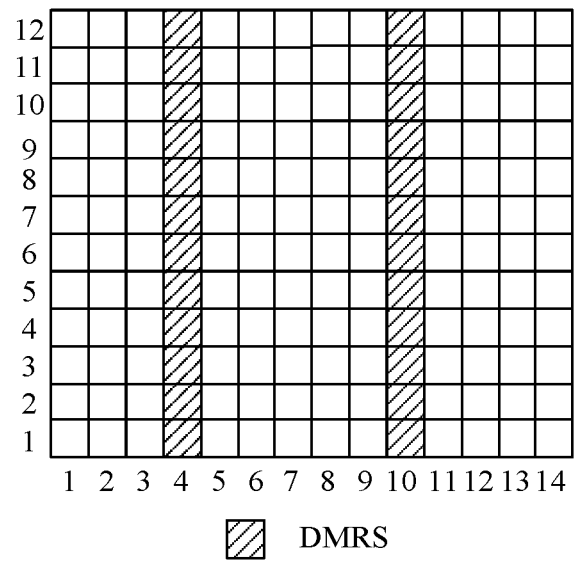

In FIG. 13, a symbol 4 and a symbol 10 are used to carry a DMRS. In such a design, overheads are relatively low, spectral efficiency can be improved, and channel estimation performance of a common moving scenario can be satisfied. In addition, such a design can satisfy a frame structure in which a PUCCH exists, and the DMRS and the PUCCH can be staggered.

FIG. 14 to FIG. 20 each are a schematic diagram of a DMRS pattern in which each DMRS basic pattern occupies two symbols.

Figure 14:
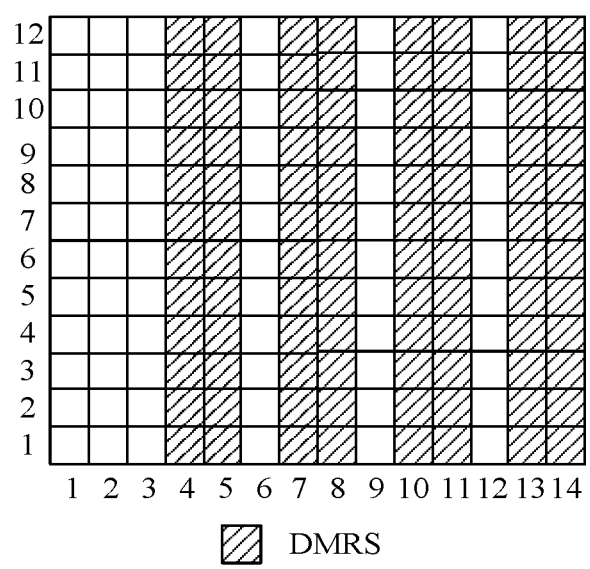

In FIG. 14, a symbol 4, a symbol 5, a symbol 7, a symbol 8, a symbol 10, a symbol 11, a symbol 13, and a symbol 14 are used to carry a DMRS. Such a design can satisfy multi-layer data transmission in an ultra high-speed scenario, for example, meet a requirement for transmitting 8 or 12 layers of data at 500 km/h.

Figure 15:
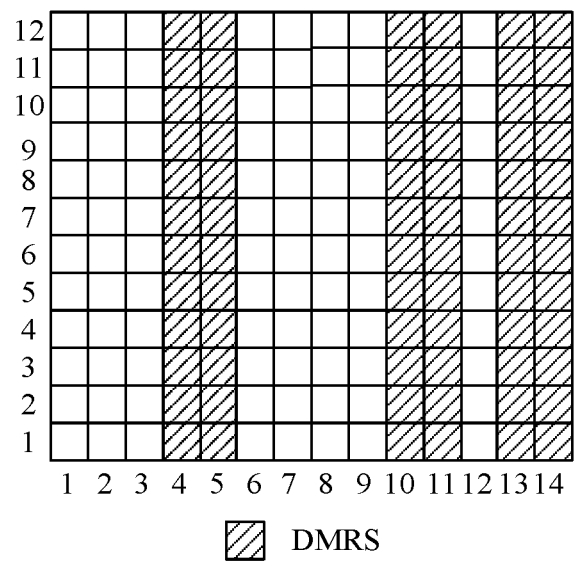

In FIG. 15, a symbol 4, a symbol 5, a symbol 10, a symbol 11, a symbol 13, and a symbol 14 are used to carry a DMRS. Compared with FIG. 13, such a design can provide higher spectral efficiency, thereby ensuring a requirement for a speed and performance.

Figure 16:
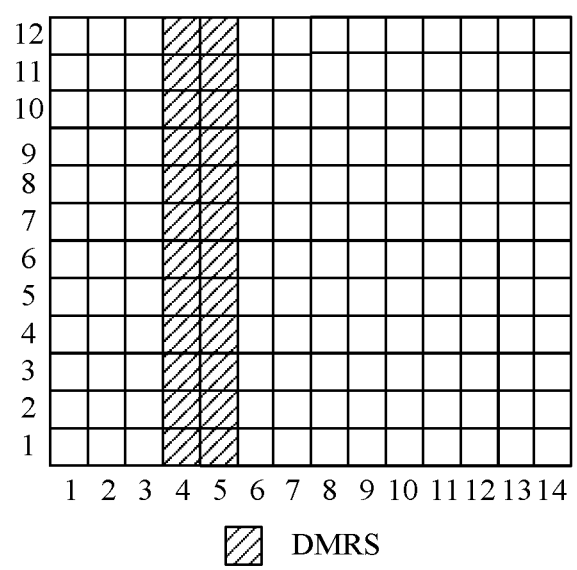

In FIG. 16, a symbol 4 and a symbol 5 are used to carry a DMRS. Such a design is applicable to a 3-PDCCH downlink frame structure or 2-PDCCH uplink frame structure, and can support a requirement for transmitting 8 or 12 layers of data, and can ensure higher channel estimation performance in a low-speed scenario.

Figure 17:
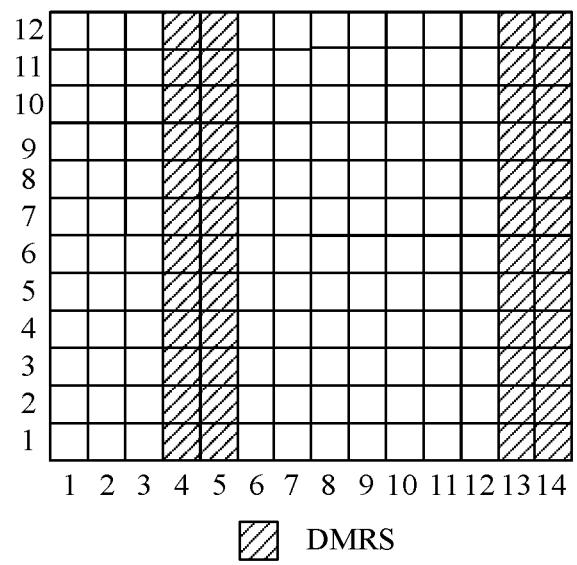

In FIG. 17, a symbol 4, a symbol 5, a symbol 13, and a symbol 14 are used to carry a DMRS. Such a design may be applied to a requirement for multi-layer data transmission at a high speed, and can provide higher channel estimation precision by obtaining a channel through DMRS interpolation in time domain.

Figure 18:
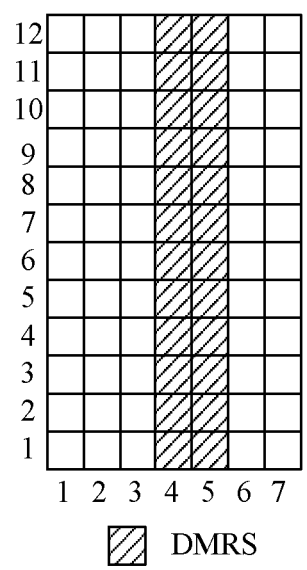

In FIG. 18, a symbol 4 and a symbol 5 are used to carry a DMRS. Such a design is applicable to a 7-symbol frame structure, and can provide a requirement for transmitting a maximum of 8 or 12 layers of data.

Figure 19:
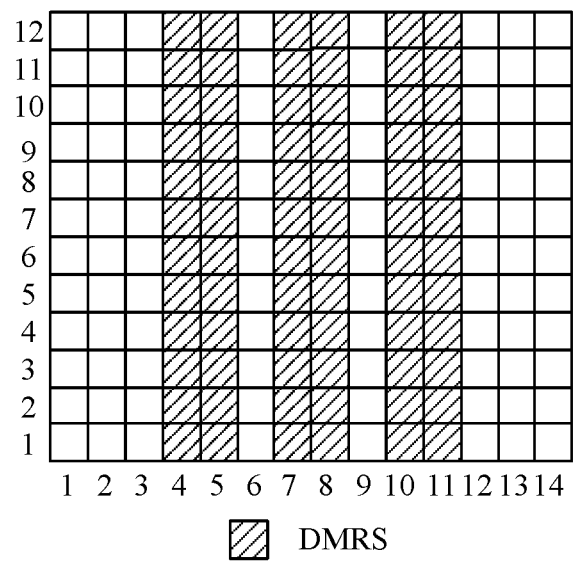

In FIG. 19, a symbol 4, a symbol 5, a symbol 7, a symbol 8, a symbol 10, and a symbol 11 are used to carry a DMRS. Such a design may be applied to a frame structure in which a PUCCH exists, and ensure system performance of multi-layer data transmission in a high-speed scenario.

Figure 20:
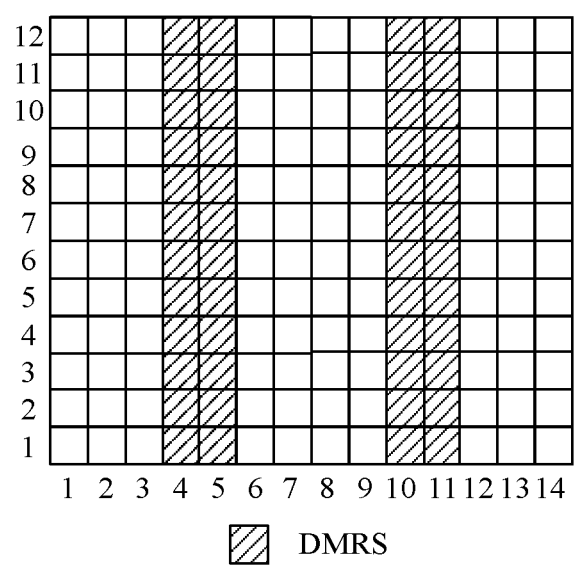

In FIG. 20, a symbol 4, a symbol 5, a symbol 10, and a symbol 11 are used to carry a DMRS. Such a design is applicable to a frame structure in which a PUCCH exists, can satisfy a 3-PDCCH scenario, and can support a requirement for transmitting a maximum of 8 or 12 layers of data in a high-speed scenario and a medium-speed scenario. In addition, such a design ensures estimation performance of a channel that quickly changes in time domain by evenly placing DMRSs in time domain.

It should be understood that, blank positions in the figures may be used to transmit data, may be used to transmit another reference signal (RS) (for example, a channel state information reference signal (CSI-RS), or a sounding reference signal (SRS)), or may be used to transmit other control signaling. The foregoing description is not intended to be limiting with respect to the scope of this application.

It should be further understood that, in all embodiments of this specification, there may be no PDCCH, or a PDCCH may occupy the first one to three symbols within a resource unit. There may be no PUCCH used to carry feedback information ACK/NACK, or a PUCCH used to carry feedback information ACK/NACK may occupy the last several symbols within a resource unit. Therefore, when a time domain position of a DMRS pattern configured by the network device and a time domain position of other signaling or another RS conflict, a DMRS may not be placed on a corresponding time domain resource, frequency domain resource, or time-frequency resource. That is, for different frame structures, the DMRS may not be placed on a time domain resource occupied by other control signaling (for example, a PDCCH) or another RS. Specifically, the DMRS may not be placed on a frequency domain position in an occupied symbol, or may not be placed on some occupied frequency domain positions in time domain.

In addition, for a case in which each DMRS basic pattern occupies two symbols, the network device may preconfigure a DMRS mapping manner. The mapping manner may be a backward-loading manner, or may be a forward-loading manner. The foregoing description is not intended to be limiting with respect to the scope of this application. Using the foregoing FIG. 14 to FIG. 20 as an example, these figures may correspond to a mapping manner of backward-loading of the candidate DMRS time domain position set {4, 7, 10, 13}, or may correspond to a mapping manner of backward-loading of a candidate DMRS time domain position set {5, 8, 11, 14}. That is, for different candidate DMRS time domain position sets in different mapping manners, a same DMRS pattern may be generated. The foregoing description is not intended to be limiting with respect to the scope of this application.

2. The candidate DMRS time domain position set is {4, 8, 12}.

FIG. 21 to FIG. 24 each are a schematic diagram of a DMRS pattern in which each DMRS basic pattern occupies one symbol. Compared with a 4-symbol design that can support an ultra high-speed scenario, this embodiment can ensure spectral efficiency in a high-speed scenario, and support different frame structures or service requirements.

Figure 21:
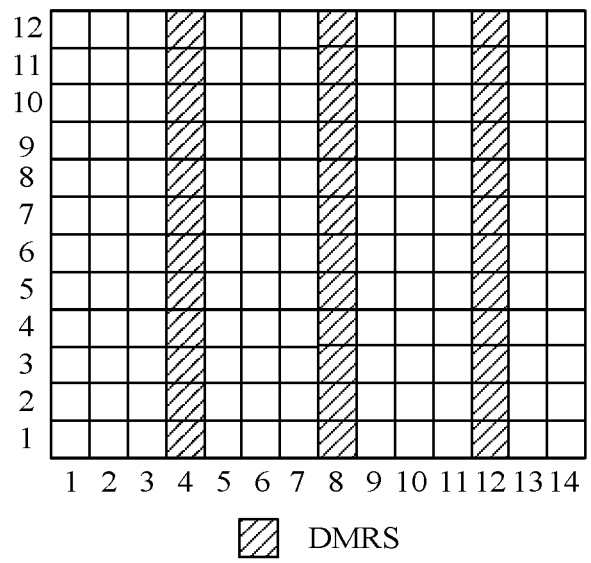

In FIG. 21, a symbol 4, a symbol 8, and a symbol 12 are used to carry a DMRS. Such a design can provide better channel estimation performance in a high-speed scenario. Compared with a pattern in which a DMRS occupies four symbols, such a design can provide higher spectral efficiency. In addition, DMRSs are evenly placed in time domain, thereby ensuring channel estimation precision.

Figure 22:
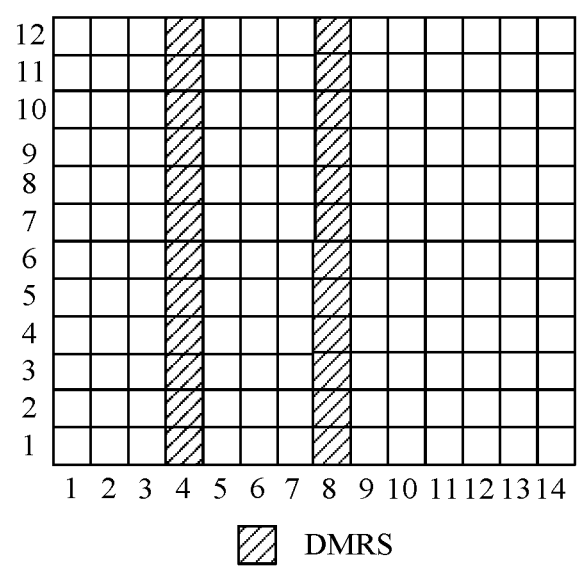

In FIG. 22, a symbol 4 and a symbol 8 are used to carry a DMRS. Such a design is applicable to a frame structure for fast feedback.

Figure 23:
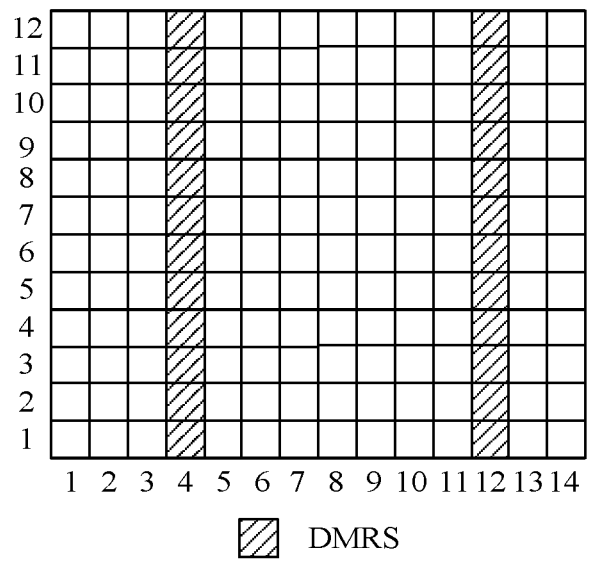

In FIG. 23, a symbol 4 and a symbol 12 are used to carry a DMRS. In such a design, DMRSs are placed on symbols located in front and behind in time domain, to ensure that a channel is obtained through interpolation in time domain, so that higher spectral efficiency can be provided and channel estimation precision is ensured. In addition, the last two symbol positions at which uplink feedback may exist are avoided.

Figure 24:
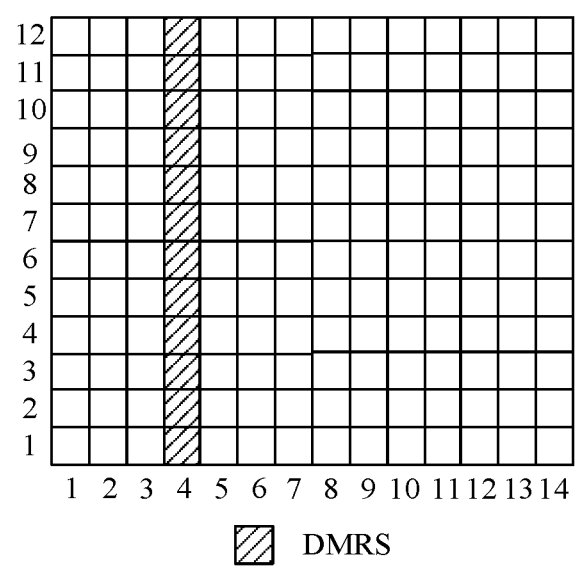

In FIG. 24, a symbol 4 is used to carry a DMRS. Such a design can satisfy maximum spectral efficiency during few-layer transmission in a 3-PDCCH scenario.

Figure 25:
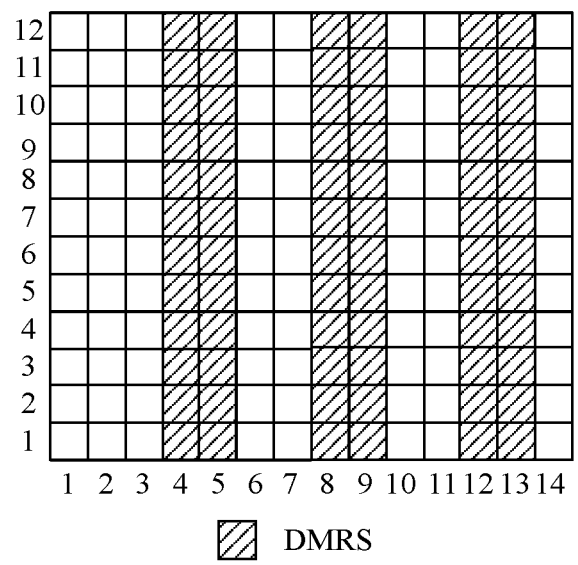
Figure 26:
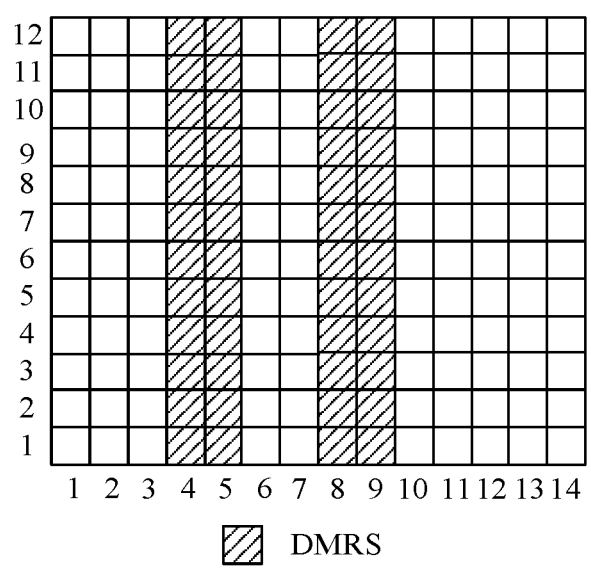
Figure 27:
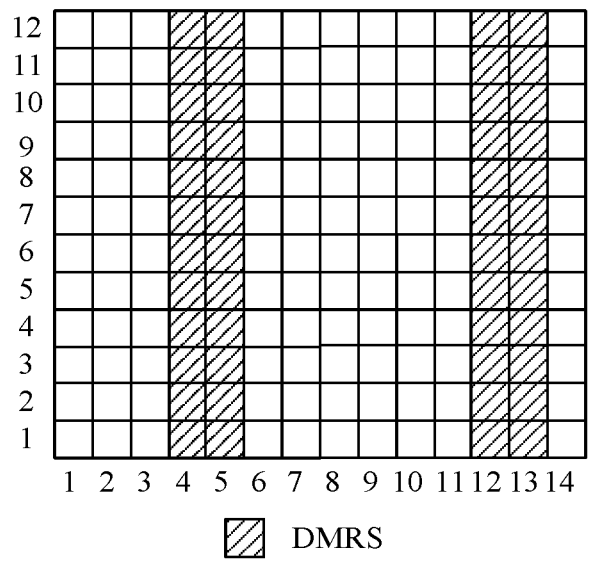

FIG. 25 to FIG. 27 each are a schematic diagram of a DMRS pattern in which each DMRS basic pattern occupies two symbols. Compared with a 4-symbol design that can support an ultra high-speed scenario, this embodiment can ensure spectral efficiency in a high-speed scenario, and support different frame structures or service requirements.

In FIG. 25, a symbol 4, a symbol 5, a symbol 8, a symbol 9, a symbol 12, and a symbol 13 are used to carry a DMRS. Such a design can satisfy a service requirement for multi-layer transmission in a high-speed scenario, and DMRSs are evenly placed in time domain, thereby ensuring channel estimation precision.

In FIG. 26, a symbol 4, a symbol 5, a symbol 8, and a symbol 9 are used to carry a DMRS. Such a design can satisfy a service requirement for multi-layer transmission with fast feedback or a PUCCH. DMRSs are placed at a front part, so that a receiving device can perform channel estimation fast and earlier, to fast decode data.

In FIG. 27, a symbol 4, a symbol 5, a symbol 12, and a symbol 13 are used to carry a DMRS. In a high-speed scenario, such a design satisfies a service requirement for multi-layer transmission, and DMRSs are placed on symbols located in front and behind in time domain, thereby ensuring channel interpolation, and providing higher spectral efficiency.

Blank positions in the figures may be used to transmit data, may be used to transmit another reference signal (RS) (for example, a channel state information reference signal (CSI-RS), or a sounding reference signal (SRS)), or may be used to transmit other control signaling. The foregoing description is not intended to be limiting with respect to the scope of this application.

It should be understood that, in a case in which only the symbol 4 is selected to place a DMRS, a DMRS pattern configured by the network device for the set {4, 8, 12} is the same as a DMRS pattern configured for a set that includes the symbol 4. In addition, for a case in which each DMRS basic pattern occupies two symbols, if a mapping manner of backward-loading is used, FIG. 24 to FIG. 26 may correspond to the candidate DMRS time domain position set {4, 8, 12}; or if a mapping manner of forward-loading is used, FIG. 24 to FIG. 26 may correspond to a candidate DMRS time domain position set {5, 9, 13}. FIG. 25 to FIG. 27 may alternatively correspond to another candidate DMRS time domain position set, for example, a set that includes symbols 4, 5, 8, 9, 12, and 13. The foregoing description is not intended to be limiting with respect to the scope of this application.

Therefore, in this application, how to select a time domain position from a candidate DMRS time domain position set is not limited, and a specific mapping manner for placing a DMRS on a corresponding time domain resource based on a time domain position is not limited either. Any solution may fall within the scope of this application provided that the DMRS pattern in this embodiment of this application is used.

3. The candidate DMRS time domain position set is {5, 9, 13}.

FIG. 28 to FIG. 32 each are a schematic diagram of a DMRS pattern in which each DMRS basic pattern occupies one symbol. This embodiment has advantages of the foregoing {4, 8, 12} solution. To be specific, this embodiment can ensure spectral efficiency in a high-speed scenario, and support different frame structures or service requirements. In addition, this embodiment further has advantage of being applicable to a 3-PDCCH uplink transmission service. A one-symbol guard interval needs to be reserved between a PDCCH and an uplink DMRS for a system.

Figure 28:
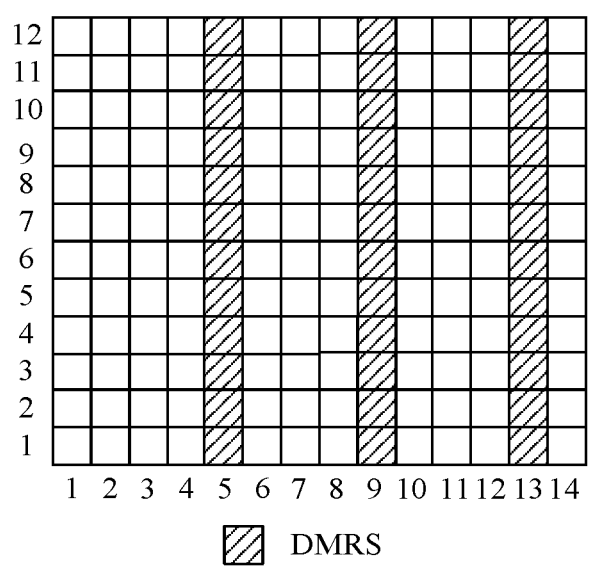

In FIG. 28, a symbol 5, a symbol 9, and a symbol 13 are used to carry a DMRS. In such a design, DMRSs are evenly placed in time domain, so that channel estimation precision in an uplink high-speed scenario can be satisfied.

Figure 29:
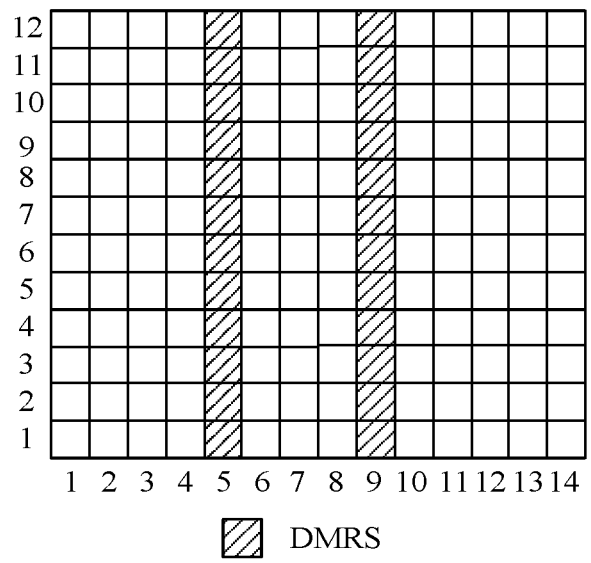

In FIG. 29, a symbol 5 and a symbol 9 are used to carry a DMRS. Such a design can satisfy a requirement for uplink fast feedback.

Figure 30:
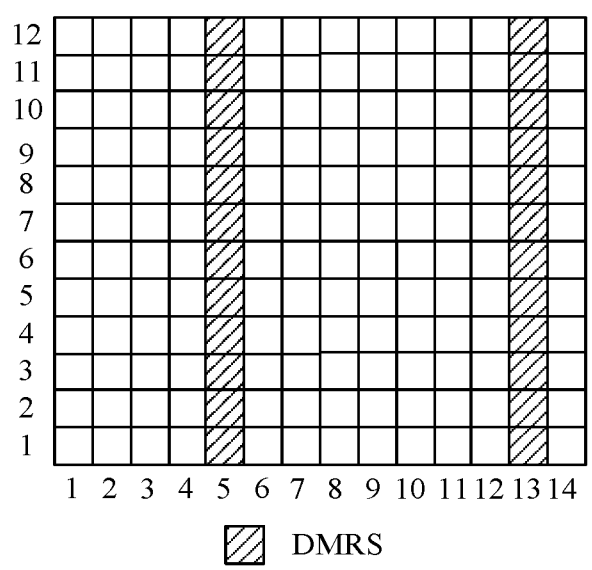

In FIG. 30, a symbol 5 and a symbol 13 are used to carry a DMRS. Such a design can provide higher spectral efficiency in a high-speed scenario, and DMRSs are placed in symbols located in front and behind in time domain, thereby ensuring that a channel is obtained through interpolation in time domain and improving channel estimation precision.

Figure 31:
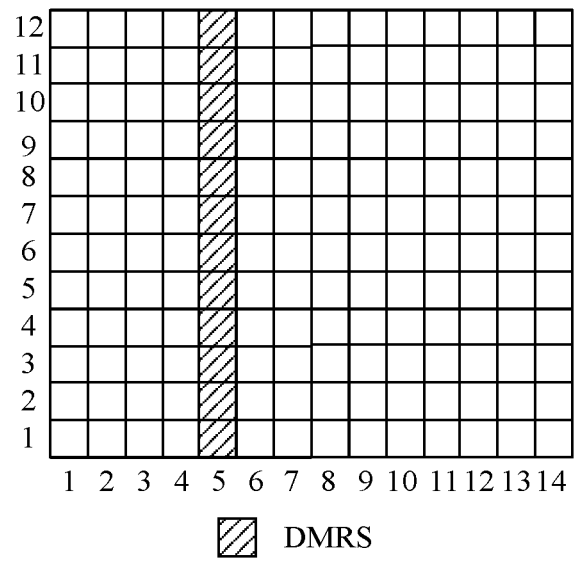

In FIG. 31, a symbol 5 is used to carry a DMRS. Such a design can provide higher spectral efficiency, and is applicable to a flexible duplex service in a 3-PDCCH scenario. For example, a downlink DMRS may be placed on the fourth symbol, and uplink and downlink DMRSs ensure orthogonality through TDM.

Figure 32:
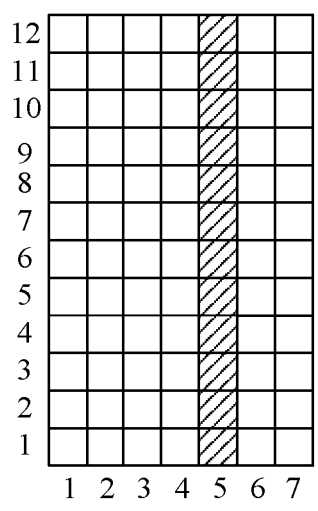

In FIG. 32, a symbol 5 is used to carry a DMRS. Such a design is applicable to a 7-symbol frame structure, and is applicable to a 3-PDCCH uplink scenario or is applicable to a 7-symbol flexible duplex service.

Figure 33:
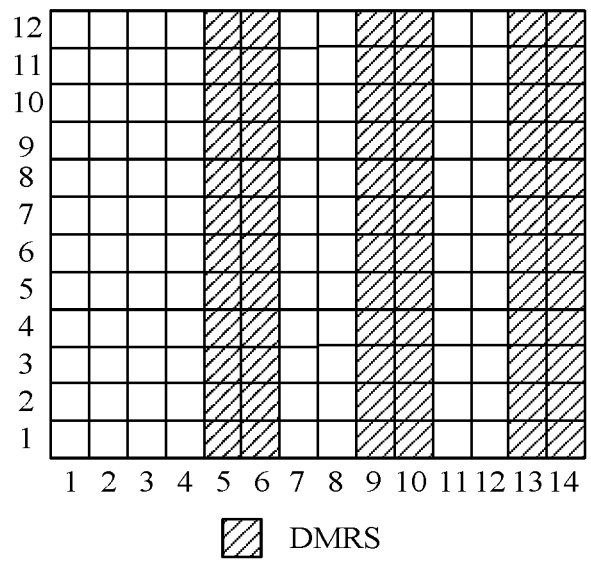
Figure 34:
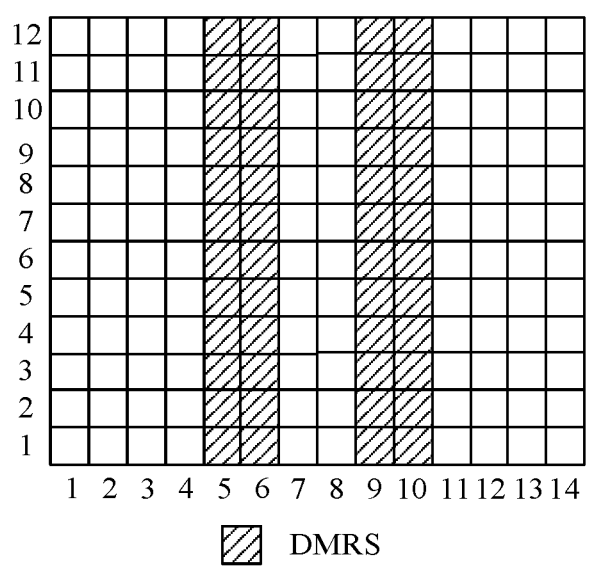
Figure 35:
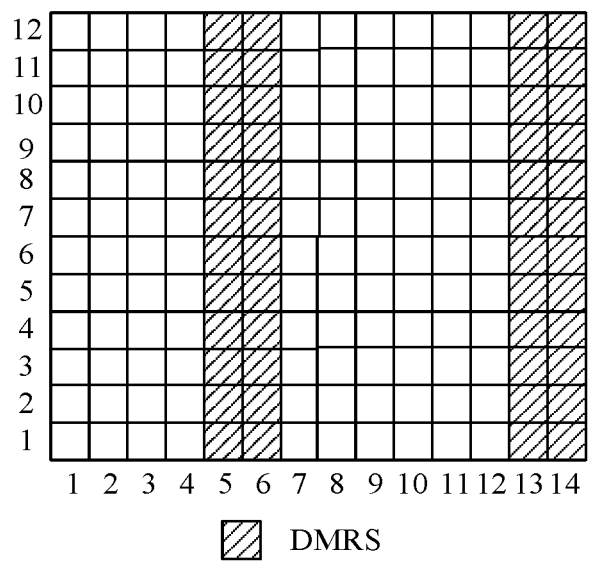

FIG. 33 to FIG. 35 each are a schematic diagram of a DMRS pattern in which each DMRS basic pattern occupies two symbols. Compared with a one-symbol design, in addition to beneficial effects of the one-symbol design, a two-symbol design can support a service requirement for transmission of data of more layers, for example, concurrent transmission of a maximum of 8 or 12 orthogonal ports, and support more multi-user pairing.

In FIG. 33, a symbol 5, a symbol 6, a symbol 9, a symbol 10, a symbol 13, and a symbol 14 are used to carry a DMRS.

In FIG. 34, a symbol 5, a symbol 6, a symbol 9, and a symbol 10 are used to carry a DMRS.

In FIG. 35, a symbol 5, a symbol 6, a symbol 13 and a symbol 14 are used to carry a DMRS.

Blank positions in the figures may be used to transmit data, may be used to transmit another reference signal (RS) (for example, a channel state information reference signal (CSI-RS), or a sounding reference signal (SRS)), or may be used to transmit other control signaling. The foregoing description is not intended to be limiting with respect to the scope of this application.

It should be understood that, in a case in which only the symbol 5 is selected to place a DMRS, a DMRS pattern configured by the network device for the set {5, 9, 13} is the same as a DMRS pattern configured for a set that includes the symbol 5. In addition, for a case in which each DMRS basic pattern occupies two symbols, if a mapping manner of backward-loading is used, FIG. 33 to FIG. 35 may correspond to the candidate DMRS time domain position set {5, 9, 13}; or if a mapping manner of forward-loading is used, FIG. 33 to FIG. 35 may correspond to a candidate DMRS time domain position set {6, 10, 14}. FIG. 33 to FIG. 35 may alternatively correspond to another candidate DMRS time domain position set. The foregoing description is not intended to be limiting with respect to the scope of this application.

Therefore, in this application, how to select a time domain position from a candidate DMRS time domain position set is not limited, and a specific mapping manner for placing a DMRS on a corresponding time domain resource based on a time domain position is not limited either. Any solution may fall within the scope of this application provided that the DMRS pattern in this embodiment of this application is used.

Optionally, there are a plurality of predefined candidate DMRS time domain position sets, for example, the set {4, 7, 10, 13}, the set {4, 8, 12}, and the set {5, 9, 13}, and each candidate DMRS time domain position set includes different candidate DMRS time domain positions, the network device may first select a candidate DMRS time domain position set from the plurality of candidate DMRS time domain position sets, and then select at least one candidate time domain position from the selected candidate DMRS time domain position set. The foregoing description is not intended to be limiting with respect to the scope of this application.

It should be understood that, for ease of understanding and description, a representation method of a time domain position in the foregoing set is to correspond to numbers 1 to 14 of time domain resources in a resource unit. When a number of a time domain resource changes, representation of a time domain position in the set may correspondingly change. For example, in addition to being represented by 1 to 14, the time domain resources may be represented by numbers 0 to 13, or represented by using front-part symbols 1 to 7 and rear-part symbols 1 to 7, or represented by using front-part symbols 0 to 6 and rear-part symbols 0 to 6. Therefore, a corresponding representation method may be used for a time domain position in the set. The foregoing description is not intended to be limiting with respect to the scope of this application.

Further, in addition to being directly represented, the foregoing set may be indirectly represented by using a formula or another manner. Using the set {4, 7, 10, 13} as an example, the network device may preconfigure n=4, and then determine a set {n, n+3, n+6, n+9}, or may preconfigure n=10, and then determine a set {n−6, n−3, n, n+3}. It should be understood that, any representation manners may be used herein, and are not listed one by one herein.

It should be understood that, in this embodiment of this application, there may be a scenario in which not all subcarriers in a symbol are occupied by a DMRS basic pattern. In this case, some subcarriers in a symbol that is used to carry the DMRS may be used to transmit data, or may not be used to place data but is used to perform DMRS power boosting. Therefore, for "the time domain resource used to carry a DMRS" in this embodiment of this application, there may be a case in which all subcarriers in a symbol are occupied by a DMRS or a case in which some subcarriers in a symbol are occupied by a DMRS.

Another possible implementation of this embodiment of this application is described in detail below with reference to FIG. 36 to FIG. 60.

The network device may select a target DMRS pattern from a plurality of predefined candidate DMRS patterns, to transmit a DMRS, so that a mapped DMRS pattern is applicable to different scenarios and different frame structures and meets different service requirements.

In this embodiment of this application, different service requirements or different application scenarios of the terminal device may correspond to different quantities of DMRSs, and the network device may select a corresponding DMRS pattern based on a quantity of DMRSs. For example, for a low-speed moving scenario, a DMRS needs to placed on only a front-part symbol within a resource unit, and no DMRS needs to be placed on a rear-part symbol within the resource unit; for a medium-speed moving scenario, in addition to placing a DMRS on a front-part symbol within a resource unit, one DMRS needs to be placed on a rear-part symbol within the resource unit; for a high-speed moving scenario, in addition to placing a DMRS on a front-part symbol within a resource unit, one or two DMRSs need to be placed on a rear-part symbol within the resource unit; for an ultra high-speed moving scenario, in addition to placing a DMRS on a front-part symbol within a resource unit, two or three DMRSs need to be placed on a rear-part symbol within the resource unit.

However, it should be understood that, in this embodiment of this application, a DMRS pattern may alternatively not be bound to a specific scenario. The network device may configure a target DMRS pattern for the terminal device according to another condition or another preset rule. The foregoing description is not intended to be limiting with respect to the scope of this application.

FIG. 36 to FIG. 41 each are a schematic diagram of a group of preset candidate DMRS patterns. Such a design can support a design requirement for a maximum of four PDCCHs, so that a DMRS and a control channel are completely staggered, thereby satisfying a higher service requirement in the future and a scenario requiring a large quantity of PDCCHs. In addition, another RS such as a CSI-RS may be placed at a front end of a frame structure.

Figure 36:
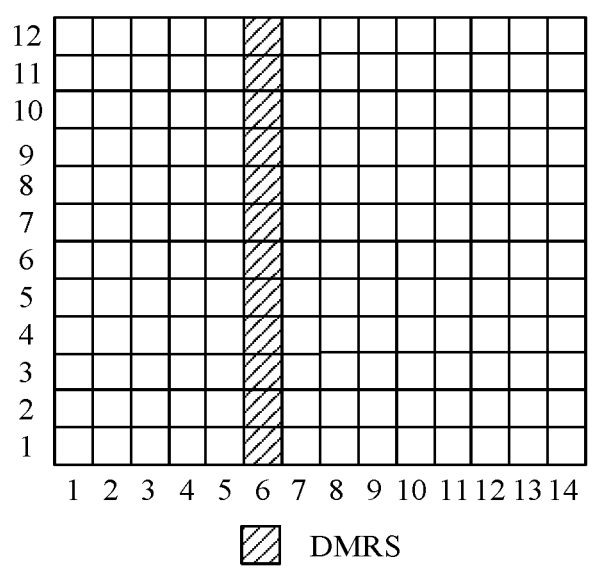
FIG. 36 to FIG. 60 each are a schematic diagram of a DMRS pattern according to another embodiment of this application.

In FIG. 36, a symbol 6 is used to carry a DMRS. Such a design is applicable to a medium-speed scenario and a low-speed scenario, and can provide higher spectral efficiency.

Figure 37:
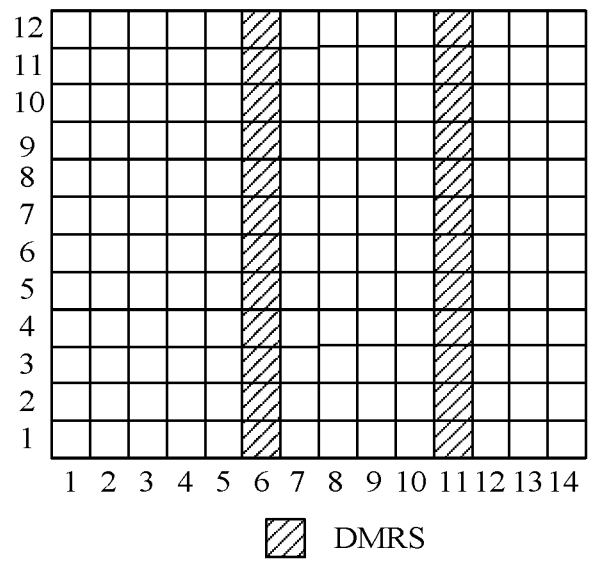

In FIG. 37, a symbol 6 and a symbol 11 are used to carry a DMRS. Such a design is applicable to a medium-speed scenario and a high-speed scenario, and can ensure channel estimation precision by evenly placing DMRSs in time domain.

Figure 38:
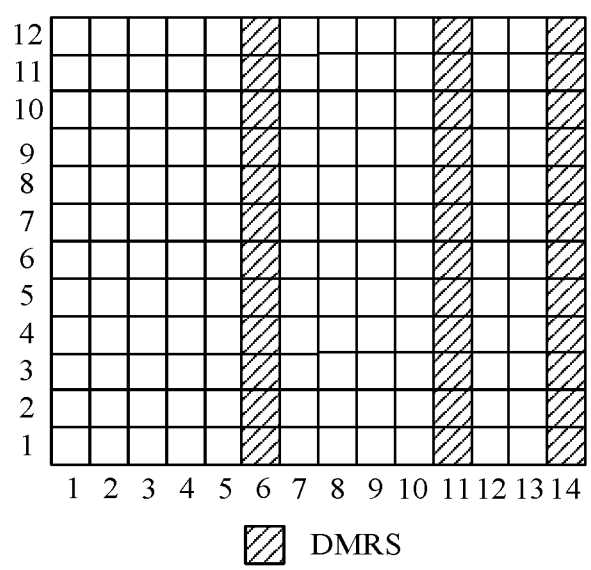

In FIG. 38, a symbol 6, a symbol 11, and a symbol 14 are used to carry a DMRS. Such a design is applicable to a high-speed scenario, and can provide higher interpolation precision by discretely placing DMRSs in time domain.

Figure 39:
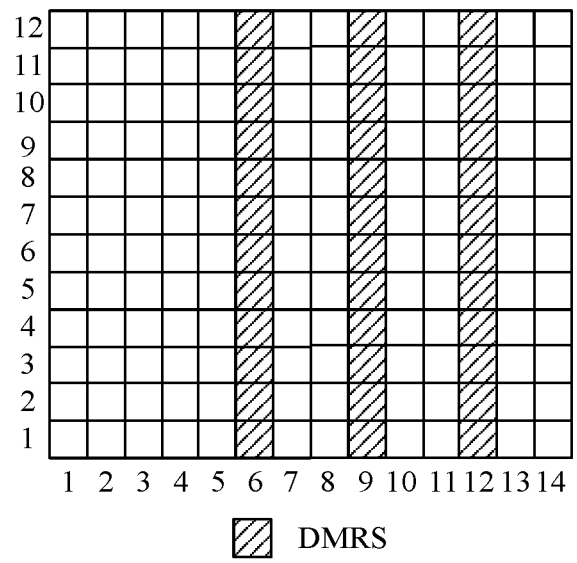

In FIG. 39, a symbol 6, a symbol 9, and a symbol 12 are used to carry a DMRS. Such a design is applicable to a high-speed scenario, and can avoid a possible uplink feedback symbol by evenly placing DMRSs in time domain.

Figure 40:
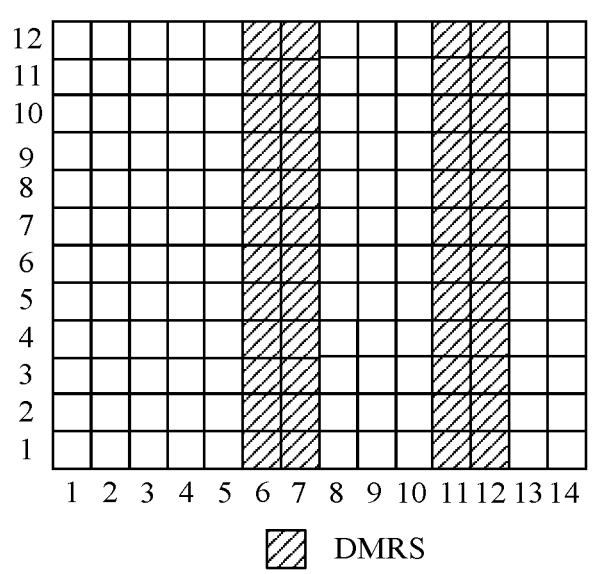

In FIG. 40, a symbol 6, a symbol 7, a symbol 11, and a symbol 12 are used to carry a DMRS. Such a design is applicable to a service requirement for a plurality of orthogonal layers in a medium-speed scenario and a high-speed scenario, and can avoid a possible uplink feedback symbol.

Figure 41:
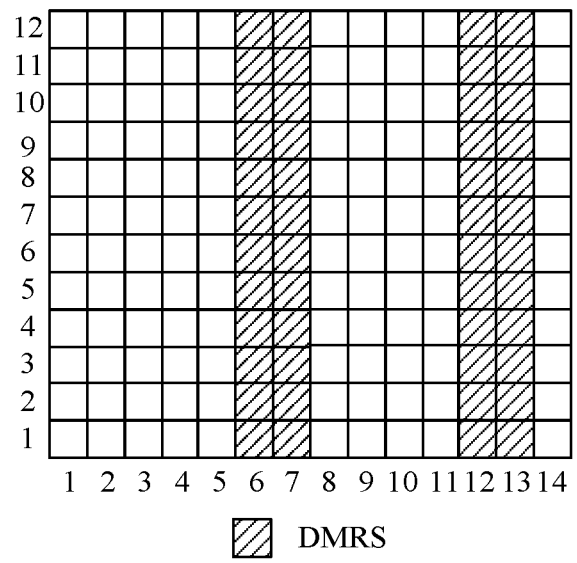

In FIG. 41, a symbol 6, a symbol 7, a symbol 12, and a symbol 13 are used to carry a DMRS. Such a design is applicable to a service requirement for a plurality of orthogonal layers in a medium-speed scenario and a high-speed scenario, and DMRSs are placed on symbols located in front and behind in time domain, thereby ensuring interpolation in time domain and providing higher channel estimation precision.

Blank positions in the figures may be used to transmit data, may be used to transmit another reference signal (RS) (for example, a channel state information reference signal (CSI-RS), or a sounding reference signal (SRS)), or may be used to transmit other control signaling. The foregoing description is not intended to be limiting with respect to the scope of this application.

It should be further understood that, there may be no PDCCH, or a PDCCH may occupy the first one to three symbols within a resource unit. There may be no PUCCH used to carry feedback information ACK/NACK, or a PUCCH used to carry feedback information ACK/NACK may occupy the last several symbols within a resource unit. Therefore, when a time domain position of a DMRS pattern configured by the network device and a time domain position of other signaling or another RS conflict, a DMRS may not be placed on a corresponding time domain resource, frequency domain resource, or time-frequency resource. That is, for different frame structures, the DMRS may not be placed on a time domain resource occupied by other control signaling (for example, a PDCCH) or another RS. Specifically, the DMRS may not be placed on a frequency domain position in an occupied symbol, or may not be placed on some occupied frequency domain positions in time domain.

In an optional embodiment, if the network device determines that one DMRS basic pattern needs to be placed on a rear-part symbol, the network device may first select FIG. 37, FIG. 40 and FIG. 41, and then perform selection based on a frame structure. For example, the network device may determine whether a DMRS basic pattern occupies one symbol or two symbols. If each DMRS basic pattern occupies one symbol, the network device may directly use FIG. 37 as a target DMRS pattern. If each DMRS basic pattern occupies two symbols, the network device may further determine whether feedback information needs to be transmitted. If the feedback information needs to be transmitted, the network device may select FIG. 40 as a target DMRS pattern. If the feedback information does not need to be transmitted, the network device may select either of FIG. 40 and FIG. 41, or may perform selection with reference to another system parameter. The foregoing description is not intended to be limiting with respect to the scope of this application. In another optional embodiment, for a scenario in which each DMRS basic pattern occupies two symbols and one DMRS basic pattern needs to be placed on a rear-part symbol, under some conditions (for example, a frame structure, a transmission mode, a system parameter, and a bandwidth), the network device may directly determine FIG. 40 as a target DMRS pattern.

A specific method for selecting a target DMRS pattern when the network device determines that two DMRSs or three DMRSs need to be placed on a rear-part symbol is similar to the foregoing method, and details are not described herein.

FIG. 42 to FIG. 60 each are a schematic diagram of another possible candidate DMRS pattern. The following figures show an example in which one resource unit includes a 14-symbol DMRS pattern. It may be understood that, this embodiment of this application is also applicable to a 7-symbol or mini-slot frame structure. In this case, a sequence number of a symbol on which a DMRS is located remains unchanged.

FIG. 42 to FIG. 54 each are a schematic diagram of a DMRS pattern in which each DMRS basic pattern occupies one symbol.

Figure 42:
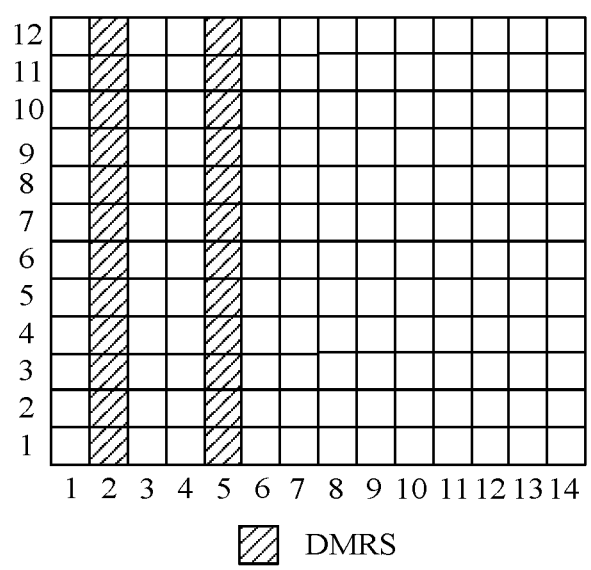

In FIG. 42, a symbol 2 and a symbol 5 are used to carry a DMRS. Such a design is applicable to a requirement for fast feedback with one PDCCH.

Figure 43:
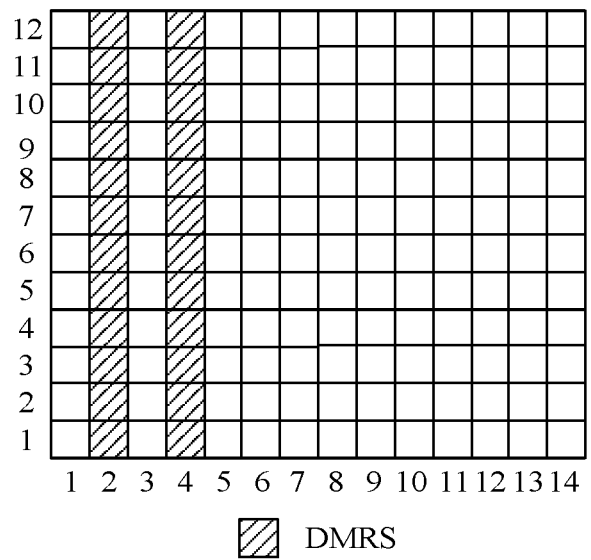

In FIG. 43, a symbol 2 and a symbol 4 are used to carry a DMRS.

Figure 44:
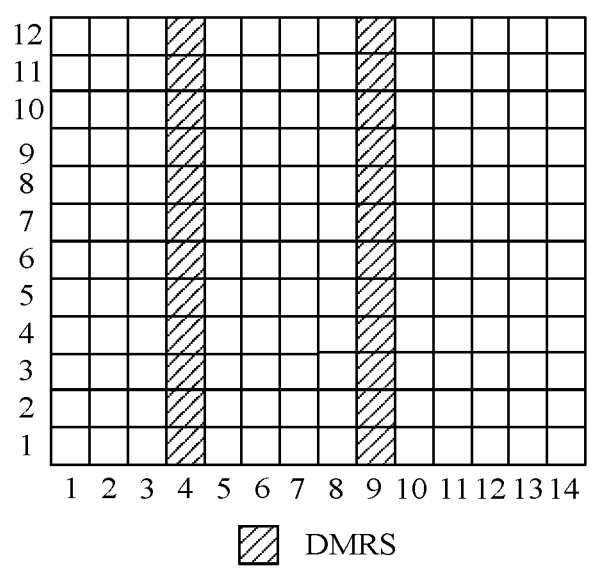

In FIG. 44, a symbol 4 and a symbol 9 are used to carry a DMRS. Such a design has an advantage of fast demodulation, and an additional DMRS is placed in front, so that a processing delay can be reduced and channel estimation in a high-speed scenario can be ensured.

Figure 45:
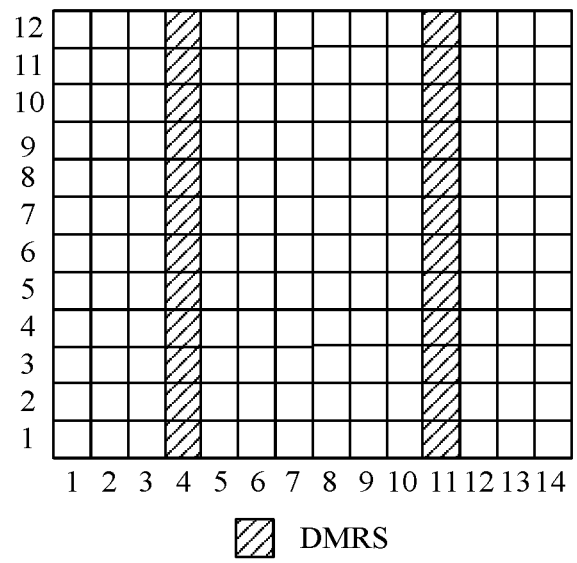

In FIG. 45, a symbol 4 and a symbol 11 are used to carry a DMRS. Compared with the design in FIG. 44, such a design has better channel estimation performance, and is applicable to a scenario requiring an uplink ACK/NACK.

Figure 46:
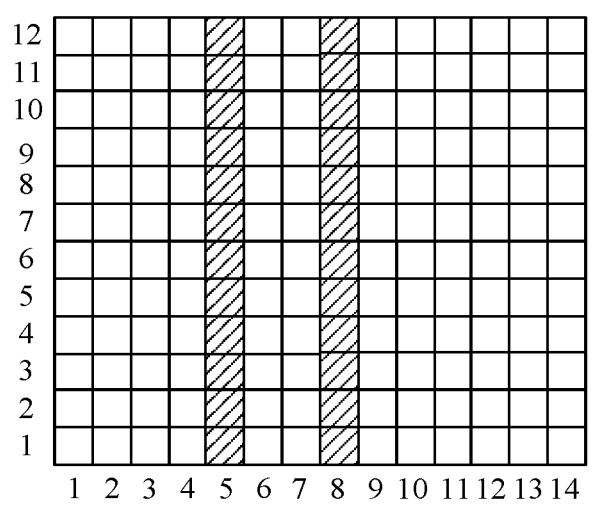

In FIG. 46, a symbol 5 and a symbol 8 are used to carry a DMRS.

Figure 47:
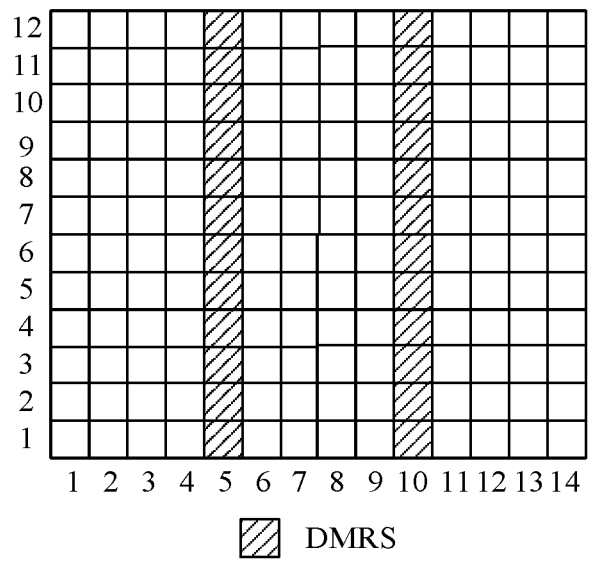

In FIG. 47, a symbol 5 and a symbol 10 are used to carry a DMRS.

Figure 48:
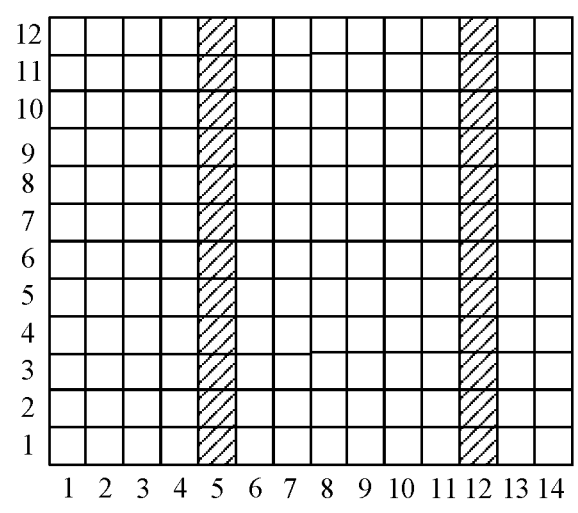

In FIG. 48, a symbol 5 and a symbol 12 are used to carry a DMRS.

Figure 49:
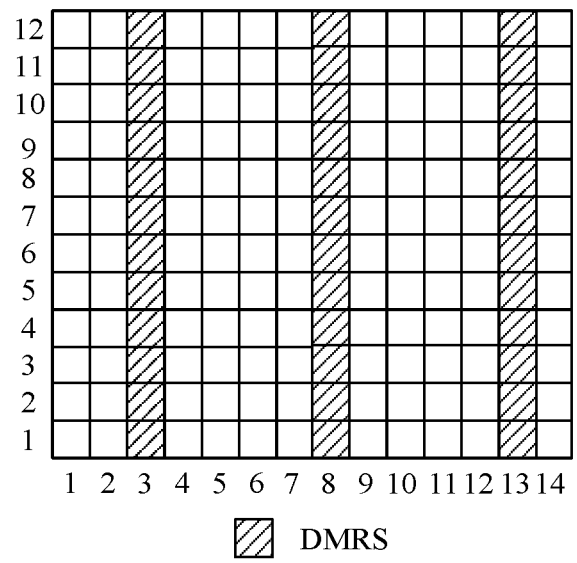

In FIG. 49, a symbol 3, a symbol 8, and a symbol 13 are used to carry a DMRS. Such a design has a feature that DMRSs are evenly distributed in time domain, and can ensure channel estimation precision in a medium-speed scenario and a high-speed scenario.

Figure 50:
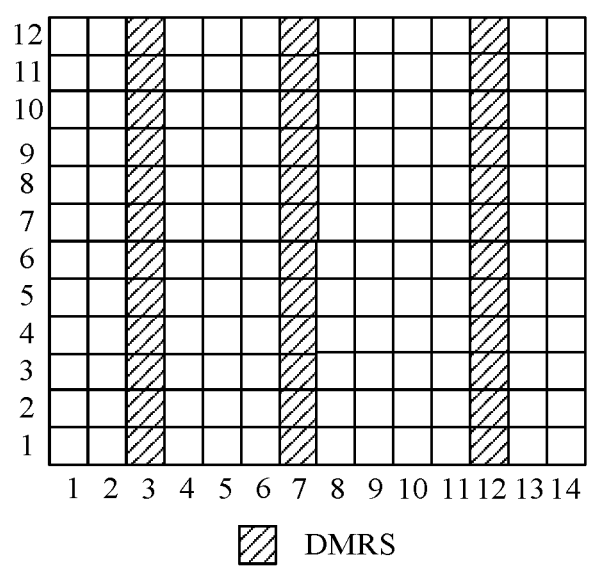

In FIG. 50, a symbol 3, a symbol 7, and a symbol 12 are used to carry a DMRS.

Figure 51:
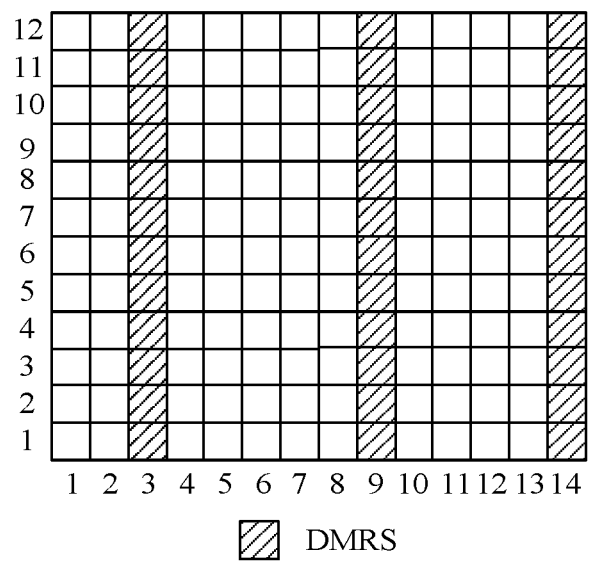

In FIG. 51, a symbol 3, a symbol 9, and a symbol 14 are used to carry a DMRS.

Figure 52:
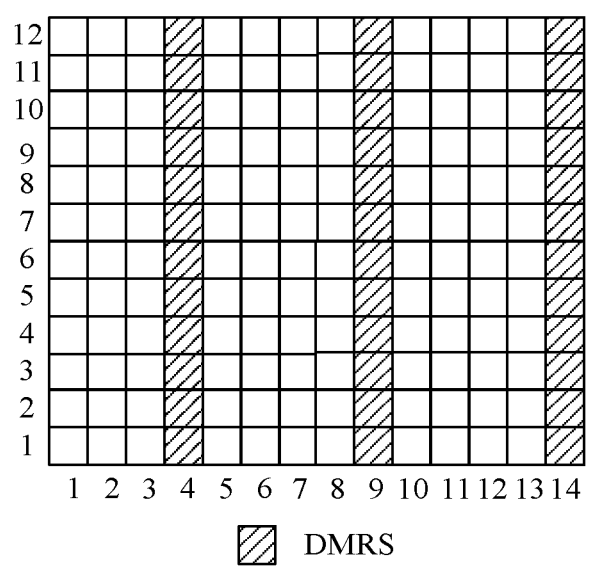

In FIG. 52, a symbol 4, a symbol 9, and a symbol 14 are used to carry a DMRS.

Figure 53:
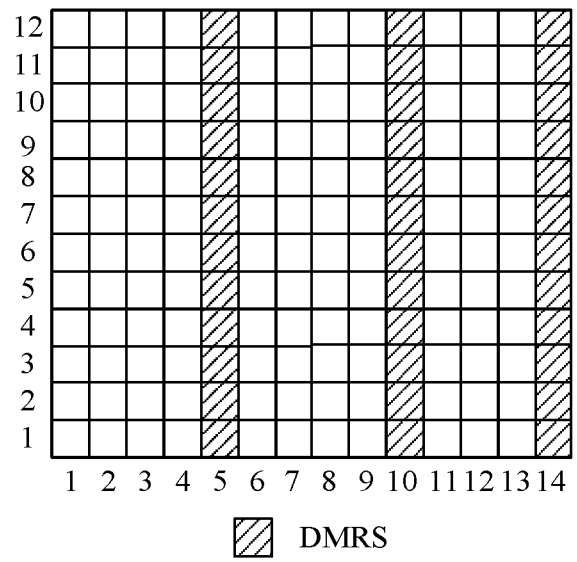

In FIG. 53, a symbol 5, a symbol 10, and a symbol 14 are used to carry a DMRS.

Figure 54:
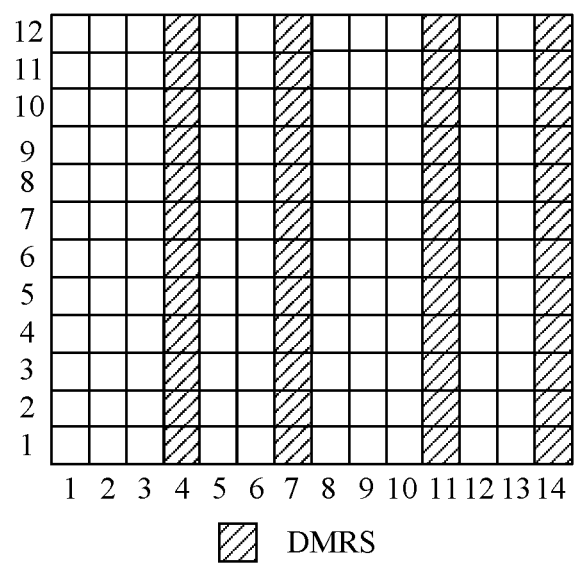

In FIG. 54, a symbol 4, a symbol 7, a symbol 11, and a symbol 14 are used to carry a DMRS. Such a design is applicable to a 3-PDCCH scenario, and ensures even interpolation of a channel in time domain in an ultra high-speed scenario, thereby obtaining higher channel estimation precision.

FIG. 55 to FIG. 58 each are a schematic diagram of a DMRS pattern in which each DMRS basic pattern occupies two symbols.

Figure 55:
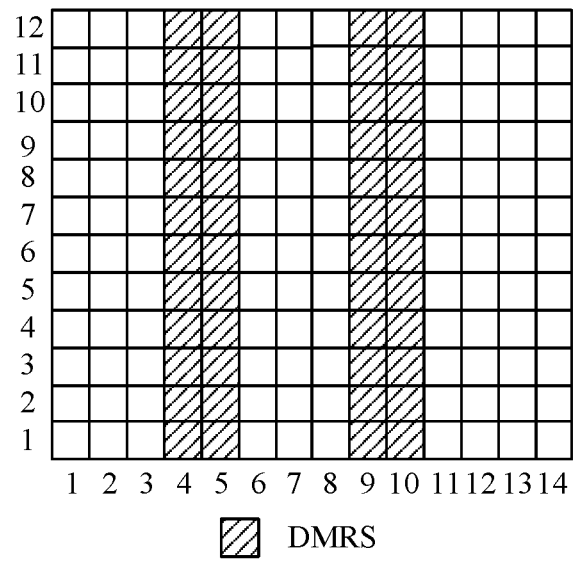

In FIG. 55, a symbol 4, a symbol 5, a symbol 9, and a symbol 10 are used to carry a DMRS. Such a design can ensure channel estimation precision in a 3-PDCCH scenario. In addition, DMRS distribution can reduce a processing delay at a receive end, thereby meeting a fast feedback requirement.

Figure 56:
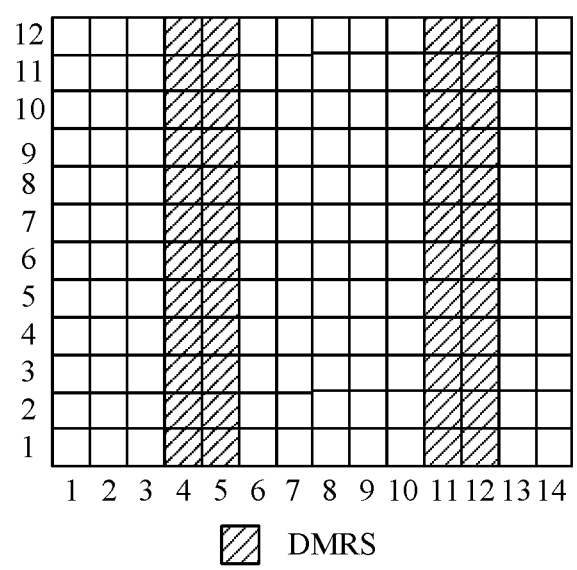

In FIG. 56, a symbol 4, a symbol 5, a symbol 11, and a symbol 12 are used to carry a DMRS. Such a design can obtain higher channel estimation precision in a 3-PDCCH high-speed scenario, and is also applicable to an uplink ACK/NACK scenario.

Figure 57:
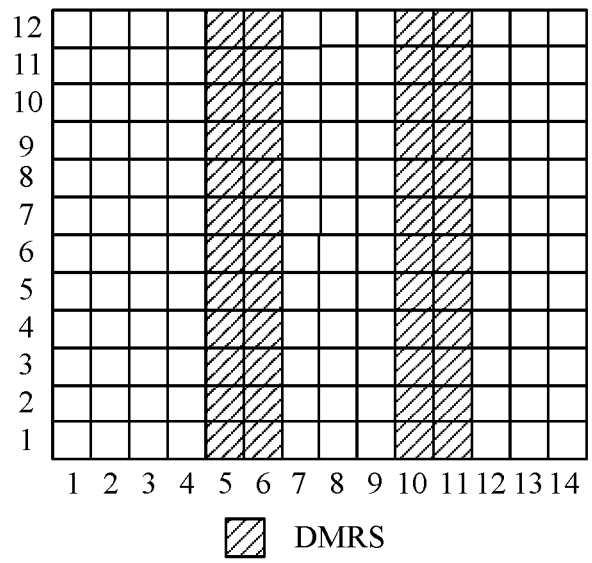

In FIG. 57, a symbol 5, a symbol 6, a symbol 10, and a symbol 11 are used to carry a DMRS.

Figure 58:
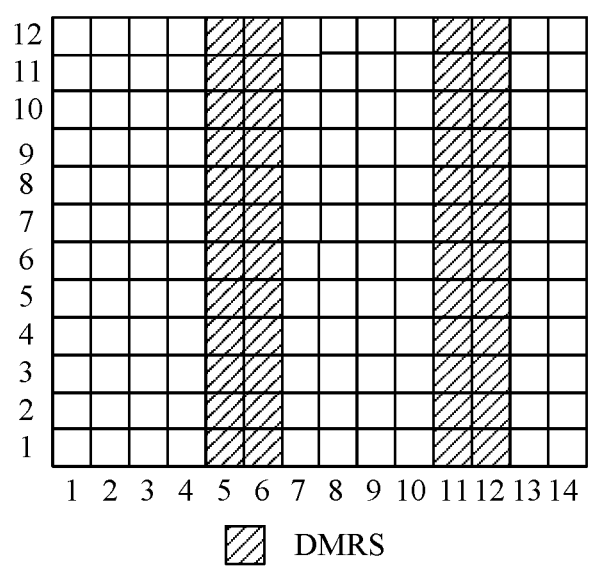

In FIG. 58, a symbol 5, a symbol 6, a symbol 11, and a symbol 12 are used to carry a DMRS.

Blank positions in the figures may be used to transmit data, may be used to transmit another reference signal (RS) (for example, a channel state information reference signal (CSI-RS), or a sounding reference signal (SRS)), or may be used to transmit other control signaling. The foregoing description is not intended to be limiting with respect to the scope of this application.

Particularly, any one or more of the DMRS patterns shown in FIG. 6 to FIG. 35 may be selected and may be bound to a quantity of DMRSs. For ease of description, the DMRS patterns provided in the foregoing are not provided in the following again. However, the DMRS patterns may still be applied to this embodiment of this application.

In addition, the predefined plurality of candidate DMRS patterns may also include patterns in which a DMRS occupies a symbol 2 or a symbol 3 in front-part symbols. Such patterns are not described one by one in this embodiment of this application.

It should be understood that, in this embodiment of this application, within a same resource unit, a DMRS basic pattern on a front-part symbol may be the same as or different from a DMRS basic pattern on a rear-part symbol. For example, within a same resource unit, a DMRS basic pattern of a DMRS on a front-part symbol may occupy two symbols, and a DMRS basic pattern of a DMRS on a rear-part symbol may occupy one symbol. The foregoing description is not intended to be limiting with respect to the scope of this application.

Figure 59:
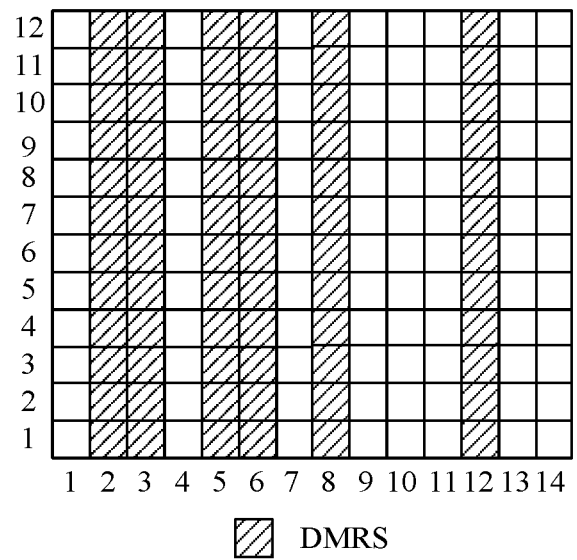
Figure 60:
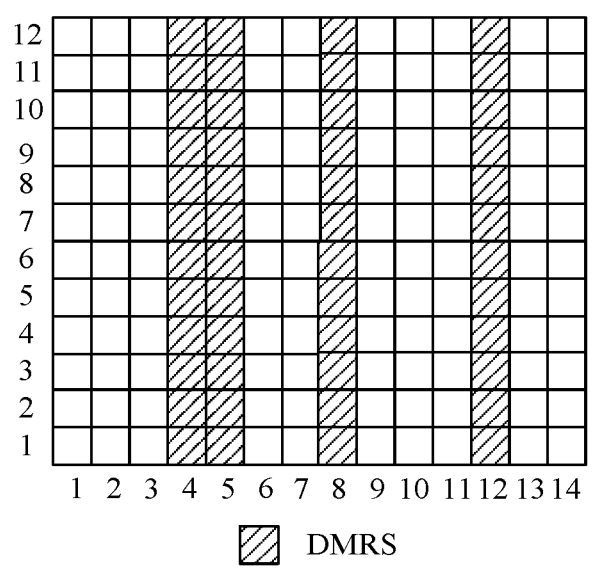

FIG. 59 and FIG. 60 are schematic diagrams of two types of candidate DMRS patterns. In FIG. 59, a symbol 2, a symbol 3, a symbol 5, a symbol 6, a symbol 8, and a symbol 12 are used to carry a DMRS. In FIG. 60, a symbol 4, a symbol 5, a symbol 8, and a symbol 12 are used to carry a DMRS. It should be understood that, when quantities of DMRSs on rear-part symbols are completely the same, the network device may perform selection based on quantities of DMRSs on front-part symbols. In an ultra high-speed scenario, usually, a plurality of DMRSs are required in time domain to ensure channel estimation precision, and transmission of a plurality of orthogonal ports requires a larger quantity of DMRS resources. Such a solution has beneficial effects of transmitting a larger quantity of DMRS and ensuring higher spectral efficiency. In addition, by using different DMRS basic patterns for a front-loaded DMRS and an additional DMRS, interpolation precision in time domain can be ensured and transmission efficiency can be improved.

As described in the foregoing embodiments, DMRSs may be classified into a DMRS located on a front-part symbol and a DMRS located on a rear-part symbol. In this specification, the DMRS located on the front-part symbol may be referred to as a first DMRS or a front-loaded DMRS (FL DMRS), and the DMRS located on the rear-part symbol may be referred to as an additional DMRS. In an implementation, a DMRS may be configured by using the following methods. During specific implementation, a downlink/uplink DMRS or DMRSs based on different frame structures or transmission requirements (for example, slot/non-slot based) are configured by using a similar method and by using same or independent signaling. A configuration of an uplink (UL) DMRS is used as an example herein.

1. An FL DMRS type, namely, a type 1 or a type 2, is configured by using RRC signaling: UL-DMRS-config-type.

2. A maximum quantity of symbols, namely, one symbol (1-symbol or single-symbol) or two symbols (2-symbol or double-symbol), of an FL DMRS is configured by using RRC signaling: UL-DMRS-len. The signaling may alternatively be implemented by a MAC CE and the like. In this embodiment of this application, the signaling used to configure the maximum quantity of symbols of the FL DMRS is referred to as fourth indication information. During specific implementation, DCI signaling may be used to indicate a current actual quantity of symbols of the FL DMRS. The signaling may be dedicated DCI signaling, or may also be used to indicate other information, for example, also used to indicate a DMRS port number of a receive end, or CDM group information. During specific implementation, similar to DCI signaling used to indicate a DMRS port number in LTE, information about an actual quantity of symbols of the FL DMRS may be added to the dedicated DCI signaling. In this embodiment of this application, the signaling used to indicate the current actual quantity of symbols of the FL DMRS is referred to as sixth indication information. In this embodiment, a DMRS whose quantity of symbols is 1 may be referred to as a 1-symbol DMRS; a DMRS whose quantity of symbols is 2 may be referred to as a 2-symbol DMRS; an FL whose quantity of symbols is 1 is referred to as a 1-symbol DMRS; and an FL whose quantity of symbols is 2 is referred to as a 2-symbol DMRS.

3. A quantity of additional DMRSs is configured by using RRC signaling: UL-DMRS-add-pos. During specific transmission, an additional DMRS and an FL DMRS may use a same DMRS pattern and port. The signaling may alternatively be implemented by using a MAC CE. In this embodiment of this application, the signaling used to configure the quantity of additional DMRSs is referred to as fifth indication information.

The receive end selects an OFDM position of an additional DMRS based on the maximum quantity of symbols of the FL DMRS, based on the quantity of additional DMRSs, based on the current actual quantity of symbols, indicated by the DCI, of the FL DMRS, based on different data mapping manners (a PUSCH/PDSCH mapping type) (optional), and based on the last symbol position of a physical downlink shared channel (PDSCH)) or a physical uplink shared channel (PUSCH).

Zero, one, two, or three additional DMRSs may be configured for a 1-symbol FL DMRS, that is, the quantity of additional DMRSs is 0, 1, 2, or 3, specifically as shown in Table 1.

When there is one additional DMRS, a configured symbol position of the one additional DMRS may be: {8th}, {10th}, or {12th}, and corresponds to a symbol position with an index (index) number being 7, 9, or 11 in Table 1. A sequence number of an OFDM symbol in Table 1 starts from 0.

When there are two additional DMRSs, configured symbol positions of the two additional DMRSs may be: {8th, 12th}, and correspond to symbol positions with index numbers being 7 and 11 in Table 1; or may be {7th, 10th}, and correspond to symbol positions with index numbers being 6 and 9 in Table 1. A sequence number of an OFDM symbol in Table 1 starts from 0.

When there are three additional DMRSs, configured symbol positions of the three additional DMRSs may be: {6th, 9th, 12th}, and correspond to symbol positions with index numbers being 5, 8, and 11 in Table 1. A sequence number of an OFDM symbol in Table 1 starts from 0. Such a scenario supports a scenario in which an FL DMRS is located on the third symbol.

TABLE 1

| Position of a last PUSCH symbol | Additional DMRS positions[j] | | | | | | | |
|---|---|---|---|---|---|---|---|---|
| | PUSCH mapping type A UL-DMRS-add-pos | | | | PUSCH mapping type B UL-DMRS-add-pos | | | |
| | 0 | 1 | 2 | 3 | 0 | 1 | 2 | 3 |
| ≤7 | — | | | | — | | | |
| 8 | — | 7 | | | | | | |
| 9 | — | 9 | 6, 9 | | | | | |
| 10 | — | 9 | 6, 9 | | | | | |
| 11 | — | 9 | 6, 9 | 5, 8, 11 | — | | | |
| 12 | — | 11 | 7, 11 | 5, 8, 11 | | | | |
| 13 | — | 11 | 7, 11 | 5, 8, 11 | | | | |

Zero or one additional DMRS may be configured for a 2-symbol FL DMRS.

When there are two additional DMRSs, configured symbol positions of the two additional DMRSs may be: {9th, 10th}, and correspond to symbol positions with an index number being 8 in Table 2; or may be {11th, 12th}, and correspond to symbol positions with an index number being 10 in Table 2.

TABLE 2

| Position of a last PUSCH symbol | Additional DMRS positions[j] | | | | | | | |
|---|---|---|---|---|---|---|---|---|
| | PUSCH mapping type A UL-DMRS-add-pos | | | | PUSCH mapping type B UL-DMRS-add-pos | | | |
| | 0 | 1 | 2 | 3 | 0 | 1 | 2 | 3 |
| ≤7 | — | | | | — | | | |
| 8 | — | | | | | | | |
| 9 | — | 8 | | | | | | |
| 10 | — | 8 | | | | | | |
| 11 | — | 8 | | | | | | |
| 12 | — | 10 | | | | | | |
| 13 | — | 10 | | | | | | |

It can be learned from the above that, currently, the quantities of the additional DMRSs of the 2-symbol FL DMRS and the 1-symbol FL DMRS are configured by using a same RRC parameter (DMRS-add-pos), and when the RRC signaling indicates that a maximum quantity of symbols of an FL DMRS is 2-symbol, a transmit end may dynamically configure, by using the sixth indication information such as DCI, that the FL DMRS is 1-symbol or 2-symbol currently. In this case, indication of a position of an additional DMRS is incorrect. In other words, when the RRC indicates that the maximum quantity of symbols of the FL DMRS is 2, the transmit end may configure a maximum of one additional DMRS. To be specific, when DMRS-len=2, DMRS-add-pos={0, 1}, so that the receive end can select a symbol position of an additional DMRS from Table 2 only when the maximum quantity of symbols of the DMRS is 2-symbol. It can be learned that, in Table 2, currently, there is only a possible start position 8 or 10 of an additional DMRS corresponding to the quantity of symbols of the DMRS being 2-symbol. If in this case, the quantity of symbols of the DMRS is 1-symbol, the receive end cannot find a possible symbol start position 7, 9, or 11 corresponding to one additional DMRS of the 1-symbol FL DMRS in Table 1, leading to an error. In addition, because the 2-symbol DMRS supports only a configuration of one additional DMRS, it can be learned that, when DMRS-add-pos=2 or 3, and the DCI dynamically indicates, to the receive end, that the current DMRS is 2-symbol, the receive end cannot identify the DMRS.

In view of such a case, this embodiment provides the following solution: The transmit end indicates, to the receive end by using the DCI signaling, whether the quantity of symbols of the (FL) DMRS is 1-symbol or 2-symbol. The receive end may dynamically select, according to the indication of the DCI, a symbol position of an additional DMRS corresponding to the quantity of symbols of the (FL) DMRS being 1-symbol or 2-symbol. Based on this, in this embodiment of this application, when DMRS-len=2, the receive end may determine specific positions of the additional DMRSs when the quantity is 1-symbol and 2-symbol. It should be noted that, in this embodiment, the maximum quantity of symbols of the DMRS and the actual quantity of symbols (for example, 1-symbol or 2-symbol) of the DMRS refer to the maximum quantity of symbols of the FL DMRS and the actual quantity of symbols of the FL DMRS. Therefore, in the description, FL may be omitted or replaced by a synonym such as "the first" or "front-loaded". In this embodiment, it is assumed that DMRS patterns, actual quantities of symbols, port mapping manners, and multiplexing modes of an additional DMRS and an FL DMRS are exactly the same.

An RRC configuration method is described first. In this embodiment, a configuration of DMRS-add-pos may be limited.

(1) When a possible maximum quantity of symbols of an FL DMRS is 2, it may be limited in such a manner that only a maximum of one additional DMRS can be configured for a system. To be specific, when DMRS-len=2, DMRS-add-pos may be configured to only 0 or 1; or (2) A configuration range of DMRS-add-pos may not be limited. When DMRS-len=2, DMRS-add-pos may be configured to 0, 1, 2, or 3. When DMRS-add-pos=2 or 3, and the DCI indicates that the current quantity of symbols of the FL DMRS is 2, the transmit end and the receive end use a configuration of one-additional DMRS by default. To be specific, a quantity of additional DMRSs may be represented as min{1, DMRS-add-pos}; or (3) One Independent RRC may be added. For example, DMRS-add-pos-2 independently indicates a quantity of additional DMRSs for a 2-symbol FL DMRS. When the DCI indicates that the FL DMRS is 2-symbol, the receive end determines the quantity of additional DMRSs by using DMRS-add-pos-2. When the DCI indicates that the FL DMRS is 1-symbol, the receive end determines the quantity of additional DMRSs by using DMRS-add-pos. In an implementation method, for the RRC configuration methods (1) and (2), when the transmit end sends the DCI signaling to indicate that the current actual quantity of symbols of the FL DMRS is 2-symbol, the receive end directly selects a symbol position of an additional DMRS corresponding to 2-symbol DMRS according to Table 2. When the transmit end sends the DCI signaling to indicate that the current or the actual quantity of symbols of the FL DMRS is 1-symbol, the receive end adds, based on a symbol position of an additional DMRS corresponding to 2-symbol in Table 2, 1 to the symbol position, to obtain a symbol position of the additional DMRS corresponding to the 1-symbol DMRS. For example, a symbol position with an index number being 9 is obtained by adding 1 to a symbol position with an index number being 8 in Table 2 and may be represented by using {10th}. A symbol position with an index number being 11 is obtained by adding 1 to the symbol position with the index number being 10 in Table 2 and may be represented by using {12th}.

In another implementation method, a column in Table 2 used to indicate a symbol position of an additional DMRS may be divided into two columns, namely, (single-symbol DMRS) and (double-symbol DMRS), as shown in Table 3. Certainly, single-symbol DMRS herein may be represented by (1-symbol DMRS), and double-symbol DMRS may be represented by (2-symbol DMRS).

The receive end may find a specific symbol position of an additional DMRS based on 1-symbol (single-symbol or one-symbol) or 2-symbol (double-symbol or two-symbol) indicated by the DCI signaling, that is, based on a quantity of symbols.

initiation of a system, or may be written into the transmit end, and is then notified by the transmit end to the receive end by using signaling. In this embodiment, when the transmit end is a network device or a base station, the receive end is a terminal device.

During specific implementation, an embodiment of this application provides a network device, configured to implement the foregoing method procedure. The network device includes:

a processor, configured to set a maximum quantity of symbols of a first DMRS in DMRSs for a terminal device, where the DMRSs are carried on a time-frequency resource configured by the network device for the terminal device and include the first DMRS and an additional DMRS; and a transceiver, configured to send fourth indication information to the terminal device, where the fourth indication information is used to indicate the maximum quantity of symbols of the first DMRS in the DMRSs to the terminal device, where the transceiver is further configured to send fifth indication information to the terminal device, where the fifth indication information is used to indicate a quantity of additional DMRSs in the DMRSs to the terminal device; and the transceiver is further configured to send sixth indication information to the terminal device, where the sixth indication information is used to indicate an actual quantity of symbols of the first DMRS to the terminal device.

TABLE 3

| | Additional DMRS positions$^j$ | | | | | | | | | |
|---|---|---|---|---|---|---|---|---|---|---|
| | PUSCH mapping type A UL-DMRS-add-pos | | | | | | | | | |
| Position of | 1 | | 2 | | 3 | | | | | |
| a last PUSCH | single-symbol | Double-symbol | single-symbol | Double-symbol | single-symbol | Double-symbol | PUSCH mapping type B UL-DMRS-add-pos | | | |
| symbol | 0 | DMRS | DMRS | DMRS | DMRS | DMRS | DMRS | 0 | 1 | 2 | 3 |
| ≤7 | — | | | — | | — | — | | | | |
| 8 | — | 7 | | | — | | — | — | | | |
| 9 | — | 9 | 8 | 6, 9 | — | | — | — | | | |
| 10 | — | 9 | 8 | 6, 9 | — | | — | — | | | |
| 11 | — | 9 | 8 | 6, 9 | — | 5, 8, 11 | — | — | | | |
| 12 | — | 11 | 10 | 7, 11 | — | 5, 8, 11 | — | — | | | |
| 13 | — | 11 | 10 | 7, 11 | — | 5, 8, 11 | — | — | | | |

In conclusion, in this embodiment, a problem of how the receive end determines a symbol position of an additional DMRS during switching between a DMRS corresponding to 2-symbol and a DMRS corresponding to 1-symbol can be resolved. Specifically, because currently, the symbol positions of the additional DMRSs corresponding to the 1-symbol FL DMRS and the 2-symbol FL DMRS are configured according to the two tables, when it is configured in the RRC in such a manner that the FL DMRS includes a maximum of two symbols, the receive end or the terminal device can select a symbol position of an additional DMRS from only a configuration table of the 2-symbol FL DMRS. Two solutions are designed in this embodiment of this application. One solution is selecting a symbol position of an additional DMRS in the configuration table of the 2-symbol FL DMRS and adding 1 to the symbol position, and the other solution is adding a symbol position of an additional DMRS corresponding to the 1-symbol FL DMRS to an original configuration table of the 2-symbol FL DMRS. Table 3 may be written into the transmit end and the receive end during The fourth indication information or the fifth indication information is carried in any one of the following signaling: radio resource control (RRC) signaling, downlink control information (DCI) signaling, and Media Access Control (MAC) control element (CE) signaling.

The sixth indication information is carried in either of the following signaling: downlink control information DCI signaling and Media Access Control MAC control element CE signaling.

In an implementation, the network device further includes:

a memory, configured to store demodulation reference signal DMRS configuration information, where the DMRS configuration information includes a symbol position of an additional DMRS corresponding to a quantity of symbols of the first DMRS being 1 and a symbol position of an additional DMRS corresponding to a quantity of symbols of the first DMRS being 2 for different quantities of additional DMRSs.

One representation form of the DMRS configuration information herein is Table 3. Certainly, there is another variant of Table 3. Any variant may fall within the scope of this embodiment of this application provided that the variant includes a symbol position of an additional DMRS corresponding to the quantity of symbols of the first DMRS being 1 and a symbol position of an additional DMRS corresponding to the quantity of symbols of the first DMRS being 2 for different quantities of additional DMRSs.

Correspondingly, an embodiment of this application further provides a terminal device. The terminal device includes:

a transceiver, configured to receive fourth indication information sent by a network device, where the fourth indication information is used to indicate a maximum quantity of symbols of a first DMRS in DMRSs, and the DMRSs are carried on a time-frequency resource configured by the network device for the terminal device and include the first DMRS and an additional DMRS, where the transceiver is further configured to: receive fifth indication information sent by the network device, where the fifth indication information is used to indicate a quantity of additional DMRSs in the DMRSs to the terminal device, and the DMRSs include the first DMRS and the additional DMRS; and receive sixth indication information sent by the network device, where the sixth indication information is used to indicate an actual quantity of symbols of the first DMRS; and a processor, configured to determine a symbol position of the additional DMRS based on the maximum quantity of symbols of the first DMRS, the actual quantity of symbols of the first DMRS, and the quantity of additional DMRSs with reference to the last symbol position on the time-frequency resource for transmitting data.

In an implementation, when the fourth indication information received by the terminal device indicates that the maximum quantity of symbols of the first DMRS is 2, the fifth indication information indicates that the quantity of additional DMRSs is 1, and the sixth indication information indicates that the actual quantity of symbols of the first DMRS is 2, a symbol position of an additional DMRS corresponding to the quantity of symbols of the first DMRS being 2 is selected from DMRS configuration information.

The DMRS configuration information herein is shown in Table 2 or Table 3.

In an implementation, when the fourth indication information received by the terminal device indicates that the maximum quantity of symbols of the first DMRS is 2, the fifth indication information indicates that the quantity of additional DMRSs is 1, and the received sixth indication information indicates that the actual quantity of symbols of the first DMRS is 1, 1 is added to a symbol position of an additional DMRS corresponding to the quantity of symbols of the first DMRS being 2 in DMRS configuration information, to obtain a symbol position of an additional DMRS corresponding to the quantity of symbols of the first DMRS being 1. The DMRS configuration information herein is shown in Table 2.

In an implementation, the terminal device may further include a memory, configured to store demodulation reference signal DMRS configuration information, where the DMRSs include the first DMRS and the additional DMRS, and the DMRS configuration information includes a symbol position of an additional DMRS corresponding to the quantity of symbols of the first DMRS being 1 and a symbol position of an additional DMRS corresponding to the quantity of symbols of the first DMRS being 2 for different quantities of additional DMRSs. One representation of the DMRS configuration information herein is Table 3. Certainly, there is another variant of Table 3. Any variant may fall within the scope of this embodiment of this application provided that the variant includes a symbol position of an additional DMRS corresponding to the quantity of symbols of the first DMRS being 1 and a symbol position of an additional DMRS corresponding to the quantity of symbols of the first DMRS being 2 for different quantities of additional DMRSs.

Based on the DMRS configuration information in Table 3, when the fourth indication information received by the terminal device indicates that the maximum quantity of symbols of the first DMRS is 2, the fifth indication information indicates that the quantity of additional DMRSs is 1, and the received sixth indication information indicates that the actual quantity of symbols of the first DMRS is 1, the DMRS configuration information is searched for a symbol position of an additional DMRS corresponding to the quantity of symbols of the first DMRS being 1.

Certainly, for resource indication and resource selection method procedures performed by the network device and the terminal device provided in this embodiment of this application, refer to the specific implementation procedures of Table 1, Table 2, and Table 3, and details are not described herein.

It should be further understood that, sequence numbers of the foregoing processes do not mean execution sequences. The execution sequences of the processes should be determined according to functions and internal logic of the processes, and should not be construed as any limitation on implementation processes of embodiments of this application.

A data transmission method according to embodiments of this application are described in detail above with reference to FIG. 1 and FIG. 60, and devices according to embodiments of this application are described in detail below with reference to FIG. 61 and FIG. 64.

Figure 61:
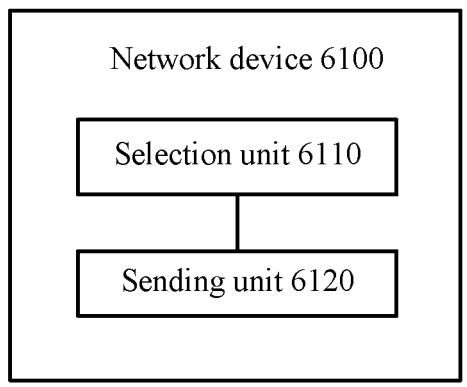
FIG. 61 is a schematic block diagram of a network device according to an embodiment of this application.

FIG. 61 shows a network device 6100 according to an embodiment of this application. The device 6100 includes:

a selection unit 6110, configured to select at least one target time domain resource from a plurality of candidate time domain resources, where the at least one target time domain resource is used to carry a DMRS; and a sending unit 6120, configured to send first indication information to a terminal device, where the first indication information is used to indicate the at least one target time domain resource.

According to the network device 6100 in this embodiment of this application, a time domain resource that is used to transmit a DMRS between a network device and a terminal device can be flexibly configured, thereby meeting different service requirements of the terminal device.

Optionally, the first indication information is specifically used to indicate a target DMRS pattern, and a time domain resource that is in the target DMRS pattern and that is used to carry the DMRS is the at least one target time domain resource; and the selection unit 6110 is specifically configured to select the target DMRS pattern from a plurality of candidate DMRS patterns.

Optionally, the selection unit 6110 is specifically configured to: determine a quantity of DMRSs; determine at least one DMRS pattern corresponding to the quantity of DMRSs from the plurality of candidate DMRS patterns based on the quantity of DMRSs; and select the target DMRS pattern from the at least one DMRS pattern based on a system parameter.

Optionally, the sending unit 6120 is further configured to: send second indication information to the terminal device before sending the first indication information to the terminal device, where the second indication information is used to indicate the plurality of candidate DMRS patterns.

Optionally, the first indication information is specifically used to indicate at least one target time domain position corresponding to the at least one target time domain resource; and the selection unit 6110 is specifically configured to: select the at least one target time domain position from a candidate time domain position set, where the candidate time domain position set includes at least one candidate time domain position.

Optionally, the sending unit 6120 is further configured to: send third indication information to the terminal device before sending the first indication information to the terminal device, where the third indication information is used to indicate the candidate time domain position set.

Optionally, the first indication information is carried in any one of the following signaling: radio resource control (RRC) signaling, downlink control information (DCI) signaling, and Media Access Control (MAC) control element (CE) signaling.

It should be understood that the device 6100 herein is represented in a form of a functional unit. The term "unit" herein may refer to an application-specific integrated circuit (ASIC), an electronic circuit, a processor for executing one or more software or firmware programs (for example, a shared processor, a dedicated processor, or a packet processor) and a memory, a combined logic circuit, and/or another appropriate component supporting the described function. In an optional example, a person skilled in the art may understand that the device 6100 may be specifically the network device in the foregoing embodiments, and the device 6100 may be configured to perform the procedures and/or the steps corresponding to the network device in the foregoing method embodiments. To avoid repetition, details are not described herein.

Figure 62:
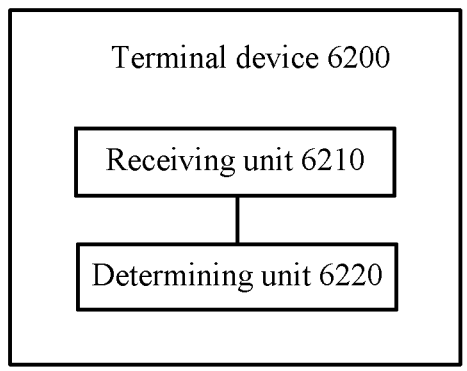
FIG. 62 is a schematic block diagram of a terminal device according to an embodiment of this application.

FIG. 62 shows a terminal device 6200 according to an embodiment of this application. The device 6200 includes:

a receiving unit 6210, configured to receive first indication information sent by a network device, where the first indication information is used to indicate at least one target time domain resource, the at least one target time domain resource is used to carry a DMRS, and the at least one target time domain resource is selected by the network device from a plurality of candidate time domain resources; and a determining unit 6220, configured to determine the at least one target time domain resource according to the first indication information.

According to the terminal device 6200 in this embodiment of this application, a time domain resource that is used to transmit a DMRS between a network device and a terminal device can be flexibly configured, thereby meeting different service requirements of the terminal device.

Optionally, the first indication information is specifically used to indicate a target DMRS pattern, a time domain resource that is in the target DMRS pattern and that is used to carry the DMRS is the at least one target time domain resource, and the target DMRS pattern is selected by the network device from a plurality of candidate DMRS patterns; and the determining unit 6220 is specifically configured to determine the at least one target time domain resource based on the target DMRS pattern.

Optionally, the receiving unit 6210 is further configured to: before receiving the first indication information sent by the network device, receive second indication information sent by the network device, where the second indication information is used to indicate the plurality of candidate DMRS patterns.

Optionally, the first indication information is specifically used to indicate at least one target time domain position corresponding to the at least one target time domain resource, the at least one target time domain position is selected by the network device from a candidate time domain position set, and the candidate time domain position set includes at least one candidate time domain position; and the determining unit 6220 is specifically configured to determine the at least one target time domain resource based on the at least one target time domain position.

Optionally, the receiving unit 6210 is further configured to: before receiving the first indication information sent by the network device, receive third indication information sent by the network device, where the third indication information is used to indicate the candidate time domain position set.

Optionally, the first indication information is carried in any one of the following signaling: radio resource control (RRC) signaling, downlink control information (DCI) signaling, and Media Access Control (MAC) control element (CE) signaling.

It should be understood that the device 6200 herein is represented in a form of a functional unit. The term "unit" herein may refer to an application-specific integrated circuit (ASIC), an electronic circuit, a processor for executing one or more software or firmware programs (for example, a shared processor, a dedicated processor, or a packet processor) and a memory, a combined logic circuit, and/or another appropriate component supporting the described function. In an optional example, a person skilled in the art may understand that the device 6200 may be specifically the terminal device in the foregoing embodiments, and the device 6200 may be configured to perform the procedures and/or the steps corresponding to the terminal device in the foregoing method embodiments. To avoid repetition, details are not described herein.

Figure 63:
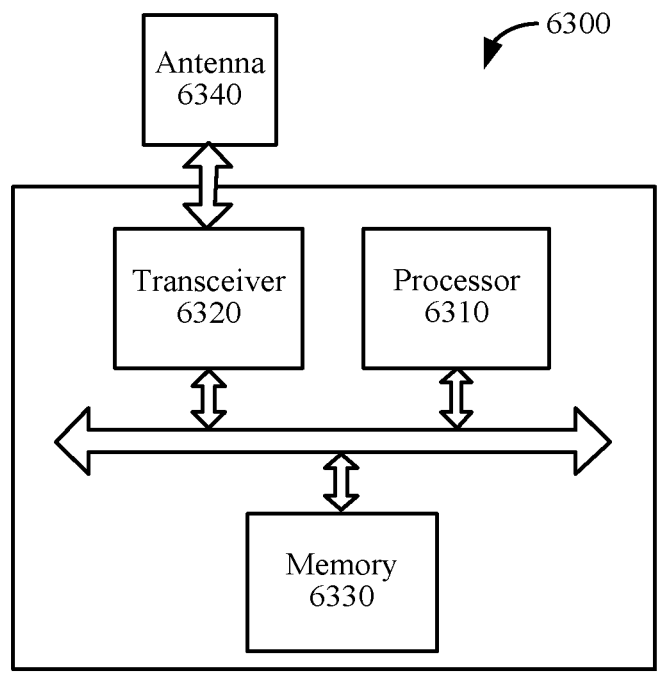
FIG. 63 is a schematic block diagram of a network device according to an embodiment of this application.

FIG. 63 shows another network device 6300 according to an embodiment of this application. The device 6300 includes a processor 6310, a transceiver 6320, and a memory 6330. The processor 6310, the transceiver 6320, and the memory 6330 may communicate with each other by using an internal connection path. The memory 6330 is configured to store an instruction. The processor 6310 is configured to execute the instruction stored in the memory 6330, to control the transceiver 6320 to send a signal and/or receive a signal.

The processor 6310 is configured to select at least one target time domain resource from a plurality of candidate time domain resources, where the at least one target time domain resource is used to carry a DMRS; and the transceiver 6320 is configured to send first indication information to a terminal device, where the first indication information is used to indicate the at least one target time domain resource.

The processor 6310 and the memory 6330 may be combined into a processing apparatus, and the processor 6310 is configured to execute program code stored in the memory 6330 to implement the foregoing functions. During specific implementation, the memory 6330 may alternatively be integrated into the processor 6310, or may be independent from the processor 6310.

The network device 6300 may further include an antenna 6340, configured to send, by using a radio signal, downlink data or downlink control signaling output by the transceiver 6320. It should be understood that, the network device 6300 may be configured to perform the steps and/or the procedures corresponding to the network device in the foregoing method embodiments. Optionally, the memory 6330 may include a read-only memory and a random access memory, and provide an instruction and data for the processor. The memory may further include a non-volatile random access memory. For example, the memory may further store information of a device type. The processor 6310 may be configured to execute the instruction stored in the memory, and when the processor 6310 executes the instruction stored in the memory, the processor 6310 is configured to perform steps and/or procedures in the method embodiments corresponding to the network device.

Figure 64:
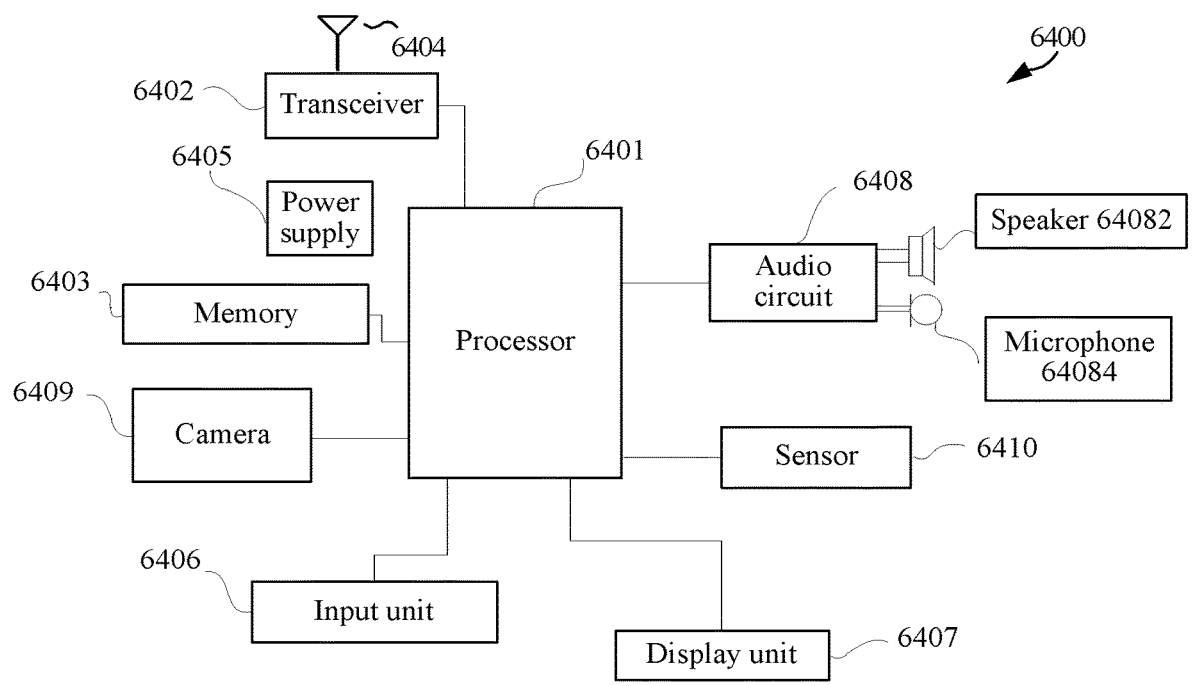
FIG. 64 is a schematic block diagram of a terminal device according to an embodiment of this application.

FIG. 64 shows another terminal device 6400 according to an embodiment of this application. As shown in FIG. 64, the terminal device 6400 includes a processor 6401 and a transceiver 6402. Optionally, the terminal device 6400 further includes a memory 6403. The processor 6401, the transceiver 6402, and the memory 6403 communicate with each other by using an internal connection path, to transfer a control and/or data signal. The memory 6403 is configured to store a computer program. The processor 6401 is configured to invoke and run the computer program in the memory 6403, to control the transceiver 6402 to send/receive a signal.

When the program stored in the memory 6403 is executed by the processor 6401, the processor 6401 is configured to: receive, by using the transceiver 6402, first indication information sent by a network device, where the first indication information is used to indicate at least one target time domain resource, the at least one target time domain resource is used to carry a DMRS, and the at least one target time domain resource is selected by the network device from a plurality of candidate time domain resources; and determine the at least one target time domain resource according to the first indication information.

The processor 6401 and the memory 6403 may be combined into a processing apparatus, and the processor 6401 is configured to execute program code stored in the memory 6403 to implement the foregoing functions. During specific implementation, the memory 6403 may alternatively be integrated into the processor 6401, or may be independent from the processor 6401. The terminal device 6400 may further include an antenna 6404, configured to send, by using a radio signal, uplink data or uplink control signaling output by the transceiver 6402.

It should be understood that, the terminal device 6400 may be configured to perform the steps and/or the procedures corresponding to the terminal device in the foregoing method embodiments. Optionally, the memory 6403 may include a read-only memory and a random access memory, and provide an instruction and data for the processor. The memory may further include a non-volatile random access memory. For example, the memory may further store information of a device type. The processor 6401 may be configured to execute the instruction stored in the memory, and when the processor 6401 executes the instruction stored in the memory, the processor 6401 is configured to perform the steps and/or the procedures corresponding to the terminal device in the method embodiments.

The processor 6401 may be configured to perform an action implemented inside a terminal described in the foregoing method embodiments, and the transceiver 6402 may be configured to perform an action of transmission or sending from one terminal device to another terminal device described in the foregoing method embodiments. For details, refer to the descriptions of the foregoing method embodiments, and details are not described herein.

The terminal device 6400 may further include a power supply 6405, configured to supply power to various components or circuits in the terminal device 6400.

In addition, to optimize functions of the terminal device, the terminal device 6400 may further include one or more of an input unit 6406, a display unit 6407, an audio circuit 6408, a camera 6409, a sensor 6410, and the like. The audio circuit may further include a speaker 64082, a microphone 64084, and the like.

It should be understood that in embodiments of this application, the processor in the network device 6300 and the terminal device 6400 may be a central processing unit (CPU), or the processor may be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

In an implementation process, steps in the foregoing methods can be implemented by using a hardware integrated logical circuit in the processor, or by using instructions in a form of software. The steps of the method disclosed with reference to embodiments of this application may be directly performed by a hardware processor, or may be performed by using a combination of hardware in the processor and a software unit. The software unit may be located in a mature storage medium in the art, such as a random access memory, a flash memory, a read-only memory, a programmable read-only memory, an electrically erasable programmable memory, a register, or the like. The storage medium is located in the memory, and the processor executes instructions in the memory and completes the steps in the foregoing methods in combination with hardware of the processor. To avoid repetition, details are not described herein.

It should be understood that, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, method steps and units described in embodiments disclosed in this specification may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not repeated herein.

In embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, and indirect couplings or communication connections between the apparatuses or units, may be electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual requirements to achieve objectives of solutions of embodiments in this application.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of the software functional unit and sold or used as an independent product, the integrated unit may be stored in a computer-readable storage medium. Based on such an understanding, technical solutions of this application may be implemented in the form of a software product. The software product is stored in a storage medium and includes several instructions for instructing a computer device (which may be a personal computer, a server, a network device, or the like) to perform all or some of the steps of the methods described in embodiments of this application. The foregoing storage medium includes any medium that can store program code, such as a Universal Serial Bus (USB) flash drive, a removable hard disk, a read-only memory (ROM), a random access memory (RAM), a magnetic disk, or an optical disc.

The foregoing descriptions are merely exemplary embodiments of this application, but are not intended to limit the protection scope of this application. Any modification or replacement readily figured out by a person skilled in the art within the technical scope disclosed in this application may fall within the protection scope of this application.

What is claimed is:

1. A data transmission method, comprising:
   selecting, by a network device, at least one target time domain resource from a plurality of candidate time domain resources, wherein the at least one target time domain resource carries a demodulation reference signal (DMRS); and
   sending, by the network device, first indication information to a terminal device, wherein the first indication information indicates the at least one target time domain resource;
   wherein the first indication information indicates a target DMRS pattern, and wherein the at least one target time domain resource is in the target DMRS pattern;
   wherein selecting the at least one target time domain resource from the plurality of candidate time domain resources comprises: selecting, by the network device, the target DMRS pattern from a plurality of candidate DMRS patterns; and
   wherein in at least one of the candidate DMRS patterns:
   a front-loaded DMRS is configured in the {4th} symbol, and an additional DMRS is configured in the {10th} symbol;
   a front-loaded DMRS is configured in the {4th} symbol, and an additional DMRS is configured in the {12th} symbol;
   a front-loaded DMRS is configured in the {4th} symbol, and an additional DMRS is configured in the {8th, 12th} symbols;
   a front-loaded DMRS is configured in the {4th} symbol, and an additional DMRS is configured in the {7th, 11th} symbols;
   a front-loaded DMRS is configured in the {4th, 5th} symbols, and an additional DMRS is configured in the {9th, 10th} symbols; or
   a front-loaded DMRS is configured in the {4th, 5th} symbols, and an additional DMRS is configured in the {11th, 12th} symbols.

2. The method according to claim 1, wherein the selecting the target DMRS pattern from the plurality of candidate DMRS patterns comprises:
   determining, by the network device, a quantity of DMRSs;
   determining, by the network device, at least one DMRS pattern corresponding to the quantity of DMRSs from the plurality of candidate DMRS patterns based on the quantity of DMRSs; and
   selecting, by the network device, the target DMRS pattern from the at least one DMRS pattern based on a system parameter.

3. A data transmission method, comprising:
   receiving, by a terminal device, first indication information sent by a network device, wherein the first indication information indicates at least one target time domain resource, wherein the at least one target time domain resource carries a demodulation reference signal (DMRS), and wherein the at least one target time domain resource was selected by the network device from a plurality of candidate time domain resources; and
   determining, by the terminal device, the at least one target time domain resource according to the first indication information;
   wherein the first indication information indicates a target DMRS pattern, wherein the at least one target time domain resource is in the target DMRS pattern, and wherein the target DMRS pattern was selected by the network device from a plurality of candidate DMRS patterns;
   wherein determining the at least one target time domain resource according to the first indication information comprises: determining, by the terminal device, the at least one target time domain resource based on the target DMRS pattern; and
   wherein in at least one of the candidate DMRS patterns:
   a front-loaded DMRS is configured in the {4th} symbol, and an additional DMRS is configured in the {10th} symbol;
   a front-loaded DMRS is configured in the {4th} symbol, and an additional DMRS is configured in the {12th} symbol;

a front-loaded DMRS is configured in the {4th} symbol, and an additional DMRS is configured in the {8th, 12th} symbols;
a front-loaded DMRS is configured in the {4th} symbol, and an additional DMRS is configured in the {7th, 11th} symbols;
a front-loaded DMRS is configured in the {4th, 5th} symbols, and an additional DMRS is configured in the {9th, 10th} symbols; or
a front-loaded DMRS is configured in the {4th, 5th} symbols, and an additional DMRS is configured in the {11th, 12th} symbols.

4. The method according to claim 3, wherein before receiving the first indication information, the method further comprises:
receiving, by the terminal device, second indication information sent by the network device, wherein the second indication information indicates the plurality of candidate DMRS patterns.

5. A network device, comprising a processor and a non-transitory memory having processor-executable instructions stored thereon, wherein the processor-executable instructions, when executed by the processor, facilitate:
selecting at least one target time domain resource from a plurality of candidate time domain resources, wherein the at least one target time domain resource carries a demodulation reference signal (DMRS); and
sending first indication information to a terminal device, wherein the first indication information indicates the at least one target time domain resources;
wherein the first indication information indicates a target DMRS pattern, and wherein the at least one target time domain resource is in the target DMRS pattern;
wherein selecting the at least one target time domain resource from the plurality of candidate time domain resources comprises: selecting the target DMRS pattern from a plurality of candidate DMRS patterns; and
wherein in at least one of the candidate DMRS patterns:
a front-loaded DMRS is configured in the {4th} symbol, and an additional DMRS is configured in the {10th} symbol;
a front-loaded DMRS is configured in the {4th} symbol, and an additional DMRS is configured in the {12th} symbol;
a front-loaded DMRS is configured in the {4th} symbol, and an additional DMRS is configured in the {8th, 12th} symbols;
a front-loaded DMRS is configured in the {4th} symbol, and an additional DMRS is configured in the {7th, 11th} symbols;
a front-loaded DMRS is configured in the {4th, 5th} symbols, and an additional DMRS is configured in the {9th, 10th} symbols; or
a front-loaded DMRS is configured in the {4th, 5th} symbols, and an additional DMRS is configured in the {11th, 12th} symbols.

6. The network device according to claim 5, wherein the processor-executable instructions, when executed, further facilitate:
determining a quantity of DMRSs;
determining at least one DMRS pattern corresponding to the quantity of DMRSs from the plurality of candidate DMRS patterns based on the quantity of DMRSs; and
selecting the target DMRS pattern from the at least one DMRS pattern based on a system parameter.

7. The network device according to claim 5, wherein the processor-executable instructions, when executed, further facilitate:
sending second indication information to the terminal device before sending the first indication information to the terminal device, wherein the second indication information indicates the plurality of candidate DMRS patterns.

8. A terminal device, comprising a processor and a non-transitory memory having processor-executable instructions stored thereon, wherein the processor-executable instructions, when executed by the processor, facilitate:
receiving first indication information sent by a network device, wherein the first indication information indicates at least one target time domain resource, wherein the at least one target time domain resource carries a demodulation reference signal (DMRS), and wherein the at least one target time domain resource was selected by the network device from a plurality of candidate time domain resources; and
determining the at least one target time domain resource according to the first indication information;
wherein the first indication information indicates a target DMRS pattern, wherein the at least one target time domain resource is in the target DMRS pattern, and wherein the target DMRS pattern was selected by the network device from a plurality of candidate DMRS patterns; and
wherein determining the at least one target time domain resource according to the first indication information comprises: determining the at least one target time domain resource based on the target DMRS pattern; and
wherein in at least one of the candidate DMRS patterns:
a front-loaded DMRS is configured in the {4th} symbol, and an additional DMRS is configured in the {10th} symbol;
a front-loaded DMRS is configured in the {4th} symbol, and an additional DMRS is configured in the {12th} symbol;
a front-loaded DMRS is configured in the {4th} symbol, and an additional DMRS is configured in the {8th, 12th} symbols;
a front-loaded DMRS is configured in the {4th} symbol, and an additional DMRS is configured in the {7th, 11th} symbols;
a front-loaded DMRS is configured in the {4th, 5th} symbols, and an additional DMRS is configured in the {9th, 10th} symbols; or
a front-loaded DMRS is configured in the {4th, 5th} symbols, and an additional DMRS is configured in the {11th, 12th} symbols.

9. The terminal device according to claim 8, wherein the processor-executable instructions, when executed, further facilitate:
before receiving the first indication information sent by the network device, receiving second indication information sent by the network device, wherein the second indication information indicates the plurality of candidate DMRS patterns.

10. The terminal device according to claim 8, wherein the first indication information indicates at least one target time domain position corresponding to the at least one target time domain resource, wherein the at least one target time domain position was selected by the network device from a candidate time domain position set, and wherein the candidate time domain position set comprises at least one candidate time domain position; and wherein the processor-executable instructions, when executed, further facilitate: determining the at least one target time domain resource based on the at least one target time domain position.

11. The terminal device according to claim 10, wherein the processor-executable instructions, when executed, further facilitate:

before receiving the first indication information sent by the network device, receiving third indication information sent by the network device, wherein the third indication information indicates the candidate time domain position set.

12. The terminal device according to claim 10, wherein the first indication information is carried in radio resource control (RRC) signaling, downlink control information (DCI), or Media Access Control (MAC) control element (CE) signaling.

* * * * *

UNITED STATES PATENT AND TRADEMARK OFFICE
CERTIFICATE OF CORRECTION

PATENT NO. : 10,938,531 B2
APPLICATION NO. : 16/432525
DATED : March 2, 2021
INVENTOR(S) : Ren et al.

Page 1 of 1

It is certified that error appears in the above-identified patent and that said Letters Patent is hereby corrected as shown below:

In the Claims

Claim 5: Column 43, Line 32: "least one target time domain resources;" should read -- least one target time domain resource; --.

Signed and Sealed this
Eleventh Day of January, 2022

Drew Hirshfeld
*Performing the Functions and Duties of the*
*Under Secretary of Commerce for Intellectual Property and*
*Director of the United States Patent and Trademark Office*